US012691476B2

(12) United States Patent
Magee et al.

(10) Patent No.: US 12,691,476 B2
(45) Date of Patent: Jul. 28, 2026

(54) WATERTIGHT HOUSING DESIGNS FOR ULTRASONIC LENS CLEANING

(71) Applicant: Texas Instruments Incorporated, Dallas, TX (US)

(72) Inventors: David P. Magee, Allen, TX (US); Hailong Chen, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 190 days.

(21) Appl. No.: 18/429,076

(22) Filed: Jan. 31, 2024

(65) Prior Publication Data

US 2024/0424537 A1     Dec. 26, 2024

Related U.S. Application Data

(60) Provisional application No. 63/544,678, filed on Oct. 18, 2023, provisional application No. 63/522,901, filed on Jun. 23, 2023.

(51) Int. Cl.
| | |
|---|---|
| *B08B 7/02* | (2006.01) |
| *B06B 1/02* | (2006.01) |
| *B06B 1/06* | (2006.01) |
| *B08B 1/02* | (2006.01) |
| *G02B 7/02* | (2021.01) |
| *G02B 27/00* | (2006.01) |
| *H04N 23/55* | (2023.01) |

(52) U.S. Cl.
CPC ............ *B08B 7/028* (2013.01); *B06B 1/0207* (2013.01); *B06B 1/0655* (2013.01); *G02B*

*7/025* (2013.01); *G02B 7/026* (2013.01); *G02B 27/0006* (2013.01); *H04N 23/55* (2023.01)

(58) Field of Classification Search
CPC .... G02B 7/026; G02B 27/0006; G02B 7/025; H04N 23/55; B06B 1/0207; B06B 1/0655; B08B 7/028
See application file for complete search history.

(56) References Cited

U.S. PATENT DOCUMENTS

| | | | |
|---|---|---|---|
| 9,454,003 B1 * | 9/2016 | Li | ......................... G02B 7/021 |
| 10,598,926 B2 | 3/2020 | Fedigan et al. | |
| 11,300,781 B2 | 4/2022 | Fedigan et al. | |
| 2012/0243093 A1 * | 9/2012 | Tonar | ..................... H10N 30/20 |
| | | | 359/507 |

(Continued)

FOREIGN PATENT DOCUMENTS

| | | | |
|---|---|---|---|
| TW | 201707113 A | * | 2/2017 |
| WO | 2021222516 A1 | | 11/2021 |

*Primary Examiner* — Benjamin L Osterhout
(74) *Attorney, Agent, or Firm* — Xianghui Huang; Frank D. Cimino

(57) ABSTRACT

Methods, apparatus, systems are described in conjunction with a watertight housing designed for ultrasonic lens cleaning. An example apparatus includes a transducer having a surface and an opening; a bracket having a first surface, a second surface, a third surface, and an opening, the first surface of the bracket coupled to the surface of the transducer, the opening of the bracket aligned with the opening of the transducer; and a lens having a first surface and a second surface, the first surface of the lens is coupled to the second surface of the bracket, the second surface of the lens coupled to the third surface of the bracket, the lens covering the opening of the transducer and the opening of the bracket.

23 Claims, 26 Drawing Sheets

(56)        References Cited

U.S. PATENT DOCUMENTS

| | | | |
|---|---|---|---|
| 2016/0266379 A1* | 9/2016 | Li | ........................... B08B 7/028 |
| 2017/0019065 A1* | 1/2017 | Li | ...................... G02B 27/0006 |
| 2018/0117642 A1* | 5/2018 | Magee | .................... G01H 1/00 |
| 2018/0188526 A1* | 7/2018 | Li | ........................... B08B 7/028 |
| 2018/0243804 A1* | 8/2018 | Magee | ................... B08B 7/028 |
| 2020/0368793 A1* | 11/2020 | Deniau | ............. G02B 27/0006 |
| 2021/0341731 A1* | 11/2021 | Magee | .............. G02B 27/0006 |
| 2023/0073537 A1* | 3/2023 | Magee | ................. B06B 1/0655 |

* cited by examiner

500

REGION 1
GLUE LAYER SHEAR STRESS

502

REGION 2
GLUE LAYER SHEAR STRESS

504
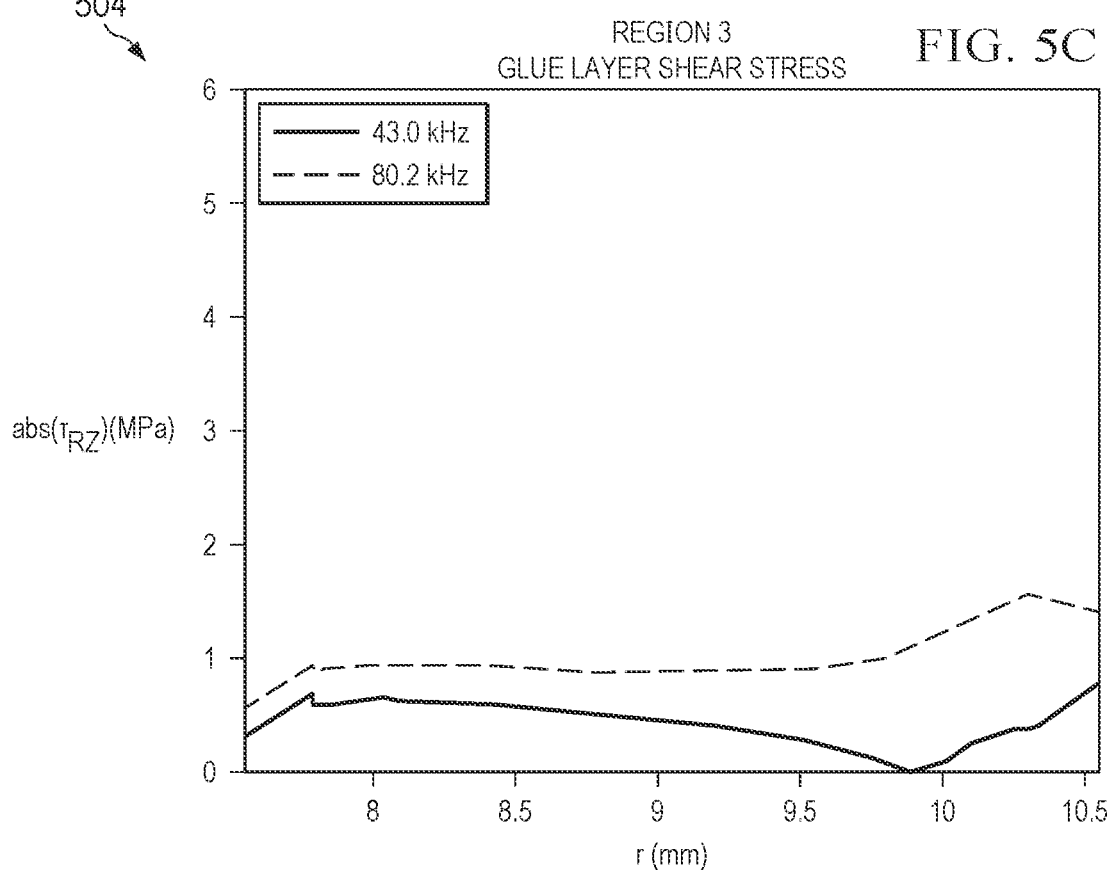
REGION 3
GLUE LAYER SHEAR STRESS          FIG. 5C

900
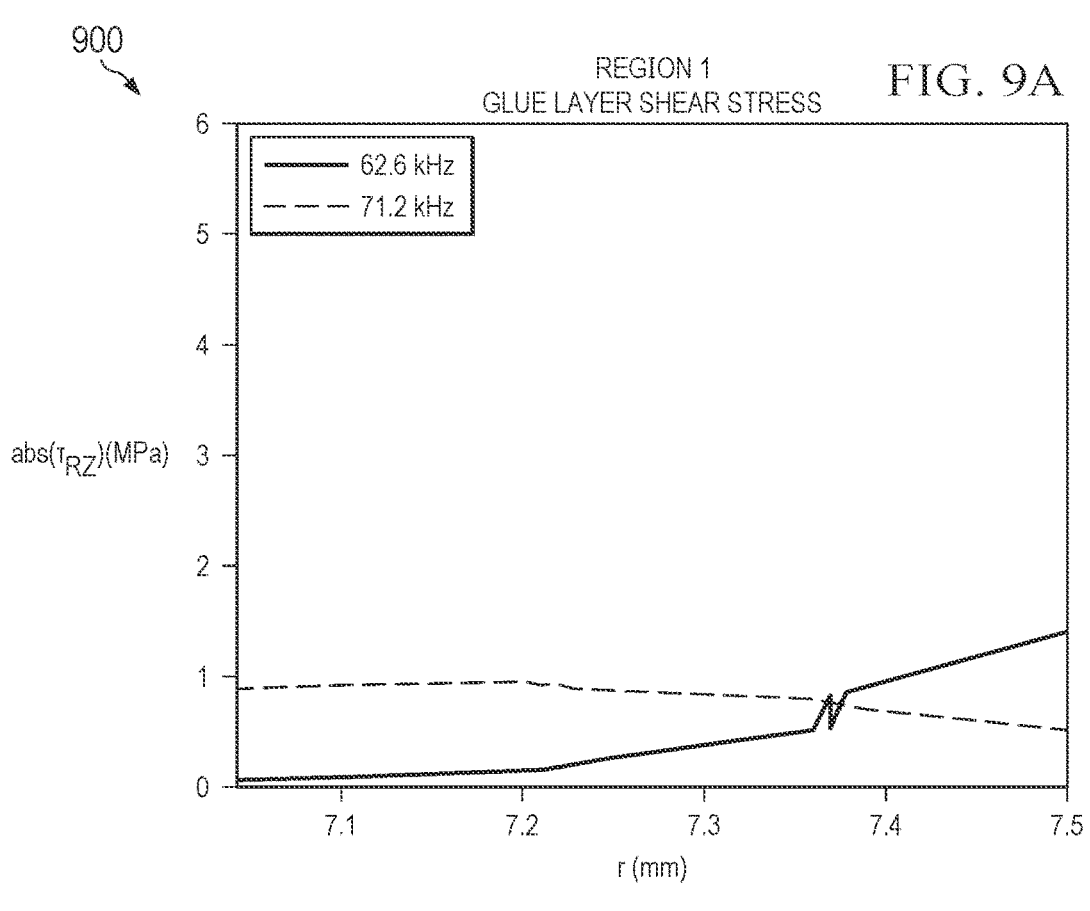
REGION 1
GLUE LAYER SHEAR STRESS                FIG. 9A
902
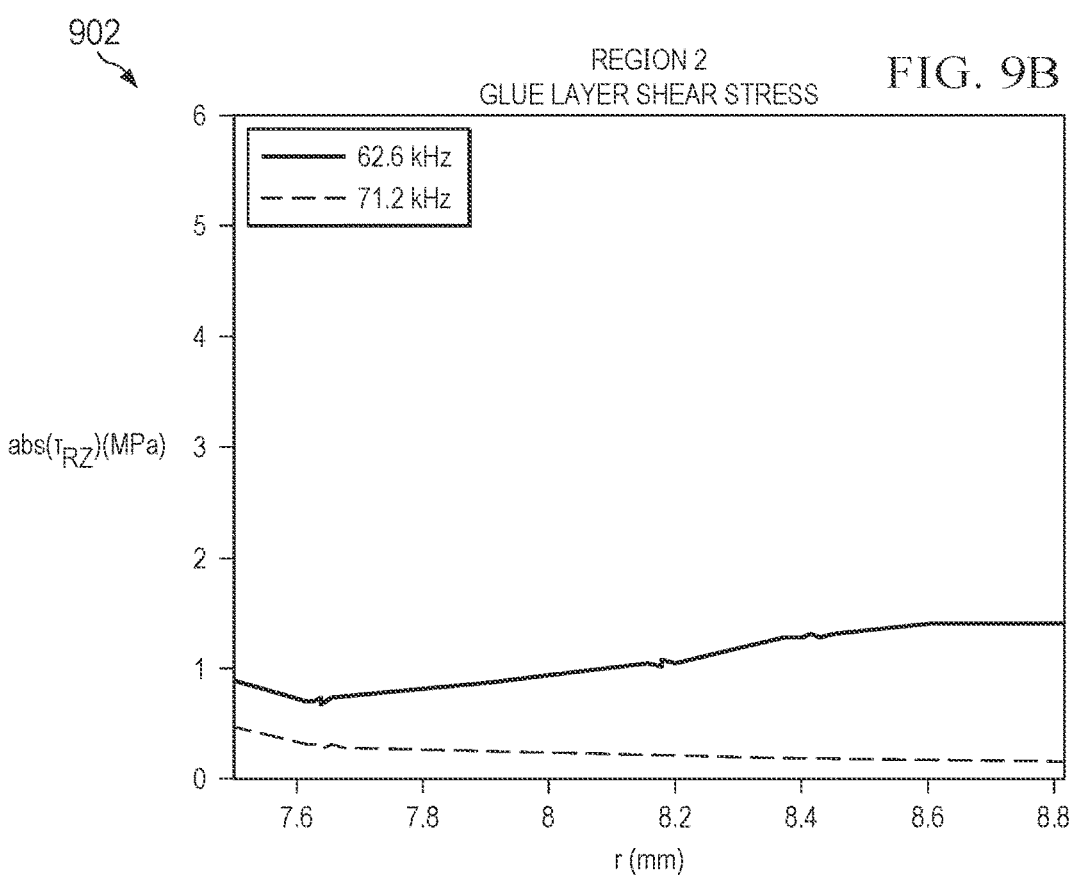
REGION 2
GLUE LAYER SHEAR STRESS                FIG. 9B

904

REGION 3
GLUE LAYER SHEAR STRESS

906

REGION 4
GLUE LAYER SHEAR STRESS

908

REGION 5
GLUE LAYER SHEAR STRESS

1300

1302

1304

1700

REGION 1
GLUE LAYER SHEAR STRESS

1702

REGION 2
GLUE LAYER SHEAR STRESS

1704

REGION 3
GLUE LAYER SHEAR STRESS

1706

REGION 4
GLUE LAYER SHEAR STRESS

1708

REGION 5
GLUE LAYER SHEAR STRESS

WATERTIGHT HOUSING DESIGNS FOR ULTRASONIC LENS CLEANING

CROSS-REFERENCE TO RELATED APPLICATION

This patent application claims the benefit of and priority to U.S. Provisional Patent Application Ser. No. 63/522,901 filed Jun. 23, 2023 and U.S. Provisional Patent Application Ser. No. 63/544,678 filed on Oct. 18, 2023, which are hereby incorporated herein by reference in their entireties.

TECHNICAL FIELD

This description relates generally to housing for lenses, and, more particularly, to watertight housing designed for ultrasonic lens cleaning.

BACKGROUND

Ultrasonic vibration techniques utilize transducers to provide a reliable and cost-effective approach to cleaning lenses. A transducer is an electrical component capable of converting electrical energy into mechanical energy, and vice versa. In some examples, driver circuitry supplies an electrical signal having a frequency and an amplitude to excite a transducer, resulting in the transducer vibrating and generating heat. For example, ultrasonic vibrations can be used to vibrate an automotive lens on a camera to remove debris (e.g., water, dirt, mud, ice, bugs, etc.) or melt ice that may partially or fully prevent the lens from viewing an environment. In this manner, a lens of an automotive camera can be cleaned without stopping a vehicle and manually cleaning the lens.

SUMMARY

An example of the description includes an apparatus which includes a transducer having a surface and an opening. The apparatus also includes a bracket having a first surface, a second surface, a third surface, and an opening, the first surface of the bracket coupled to the surface of the transducer, the opening of the bracket aligned with the opening of the transducer. The apparatus also includes a lens having a first surface and a second surface, the first surface of the lens is coupled to the second surface of the bracket, the second surface of the lens coupled to the third surface of the bracket, the lens covering the opening of the transducer and the opening of the bracket.

Another example apparatus includes a transducer having a surface and an opening. The apparatus also includes a bracket having a first surface, a second surface, a third surface, and an opening, the first surface of the bracket coupled to the surface of the transducer, the first surface and the second surface of the bracket enclose the transducer. The apparatus also includes housing having a surface and an opening, the surface of the housing coupled to the third surface of the bracket, the opening of the housing aligned with the opening of the transducer and the opening of the bracket.

Another example system includes a transducer having a surface. The system also includes a bracket having a first surface and a second surface, the first surface of the transducer is coupled to the surface of the transducer, the bracket to enclose the transducer. The system also includes a lens having a surface coupled to the second surface of the bracket, the bracket separates the transducer and the lens.

The system also includes driver circuitry coupled to the transducer, the driver circuitry configured to supply electrical energy to the transducer, the transducer is configured to vibrate the lens responsive to receiving electrical energy from the driver circuitry.

Another example apparatus includes a cap having a first surface and an opening. The apparatus also includes a membrane having a first surface, a second surface, and an opening, the first surface of the membrane coupled to the first surface of the cap, the opening of the membrane aligned with the opening of the cap. The apparatus also includes a transducer having a surface and an opening. The apparatus also includes a lens having a first surface and a second surface, the first surface of the lens is coupled to the second surface of the membrane, the second surface of the lens coupled to the surface of the transducer, the lens covering the opening of the transducer, the opening of the membrane, and the opening of the cap.

BRIEF DESCRIPTION OF THE DRAWINGS

FIGS. 5A-5C illustrate stress plots corresponding to the lens cover system of FIGS. 2 and 3.

FIGS. 9A-9E illustrate stress plots corresponding to the lens cover system of FIGS. 6 and 7A-7B.

The same reference numbers or other reference designators are used in the drawings to designate the same or similar (functionally or structurally) features.

DETAILED DESCRIPTION

Figure 1:
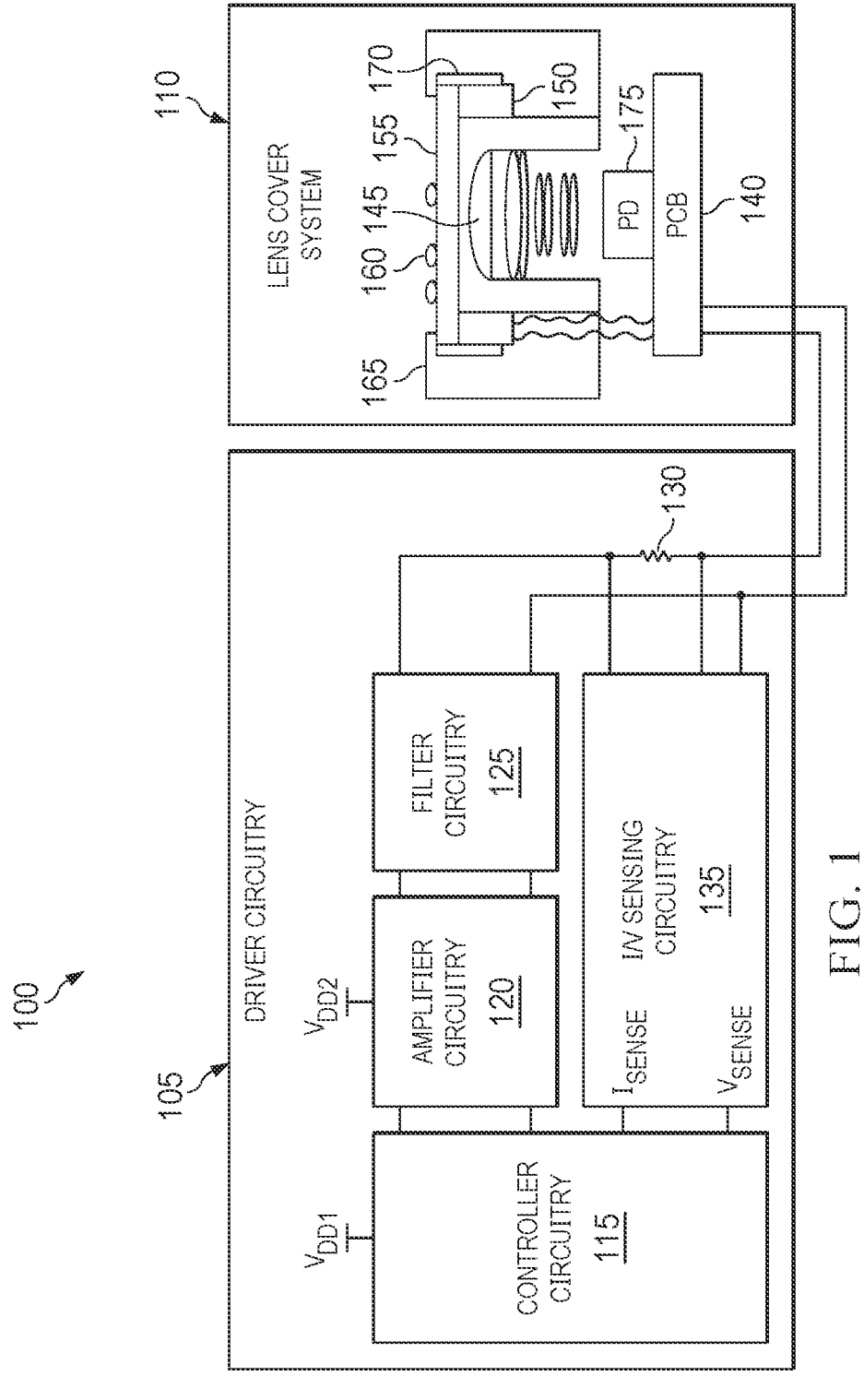
FIG. 1 is a block diagram of an example lens cleaning system including example driver circuitry having example controller circuitry, example amplifier circuitry, example filter circuitry, and example sensing circuitry, and an example lens cover system having a transducer.

The drawings are not necessarily to scale. Generally, the same reference numbers in the drawing(s) and this description refer to the same or like parts. Although the drawings show regions with clean lines and boundaries, some or all of these lines or boundaries may be idealized. In reality, the boundaries or lines may be unobservable, blended or irregular.

A transducer is an electrical component capable of converting electrical energy into mechanical energy and vice versa. In some uses, driver circuitry supplies an electrical signal having a frequency and amplitude to excite a transducer resulting in the transducer vibrating and generating heat.

Ultrasonic vibration techniques utilize transducers to vibrate a lens on a camera to remove debris (e.g., water, dirt, mud, ice, bugs, etc.) or melt ice that may partially or fully prevent the lens from viewing an environment. The housing component of the lens may include components to provide a seal to prevent contaminants (e.g., debris, liquid, etc.) from entering a housing cavity of the lens. For example, if the lens is implemented outside or in a location where the lens can be exposed to water or another liquid, the lens may need waterproofing or water resisting components to prevent or otherwise reduce the possibility of the water or liquid getting into the housing of the lens, components housed in the housing, or circuitry housed in the housing.

Some techniques for sealing the housing of the lens include a housing cap to screw into the housing to house the lens. For example, some ultrasonic leans cleaning (ULC) systems with cameras include a housing that attaches to the body of the camera. The camera lens of the ULC system is/are located at the end of the housing for light to reach the camera lens. Such ULC systems also include a transducer (e.g., an ultrasonic transducer), which is attached to the lens using adhesive, such as epoxy, glue, etc., which resides between the housing and the lens. The transducer, responsive to being excited by a signal such as an electronic waveform, causes the lens to vibrate in a predicable manner. Vibrating the lens can cause debris to be removed from the lens.

Also, such ULC systems include a gasket between the lens and the housing to allow the lens to move relative to the housing responsive to the lens is being cleaned using vibrating techniques of the ultrasonic transducer. Also, the gasket (e.g., a rubber gasket) of such ULC systems may be placed between the housing and the housing cap to prevent contaminants from entering into the housing. The housing cap of such ULC systems compresses the gasket onto the lens. However, if the housing cap compresses the gasket too much, the lens cannot vibrate at a high enough amplitude to remove debris from the lens. Also, if the housing cap does not compress the gasket enough, the gasket will not properly seal, thereby allowing contaminants to enter the housing.

Also, the properties of a gasket can change over time and can change based on external factors to reduce the sealing effect. For example, humidity levels, heat, time, etc., may cause the gasket to deform or become brittle. A deformed, brittle, or cracked gasket compromises the seal and can lead to leaks though which contaminants can enter. Also, if the gasket is compressed against the lens, the correct level of compression over the lifetime of the gasket can change, thereby compromising the seal.

Examples described herein utilize a lens encapsulation design to provide an airtight or watertight seal using a bracket and an adhesive (e.g., glue) rather than a cap and a gasket. The example watertight housing designs couple the lens directly to the bracket, which is part of the housing. The described bracket is structured to provide a watertight seal, thereby eliminating the need for the gasket. Thus, examples described herein provide a simpler bracket design for a ULC system, thereby reducing part count on the bill of materials, assembly cost, and the potential of leaks over time. Also, examples of the design uses a ring transducer, which can operate using less power than cylindrical ULC designs. Accordingly, examples described herein result in a reduction in power consumption over ULC designs that use cylindrical transducers.

FIG. 1 is a block diagram of an example lens cleaning system 100 including example driver circuitry 105 and an example lens cover system 110. In the example of FIG. 1, the driver circuitry 105 includes example controller circuitry 115, example amplifier circuitry 120, example filter circuitry 125, an example sense resistor 130, and example current and voltage (I/V) sensing circuitry 135. In the example of FIG. 1, the lens cover system 110 includes an example printed circuit board (PCB) 140, an example camera lens 145, an example transducer 150, an example lens cover 155, an example housing 165, an example seal 170, and an example photo diode 175.

The driver circuitry 105 of FIG. 1 has first and second terminals coupled to the lens cover system 110. The driver circuitry 105 supplies power to the lens cover system 110 by generating an excitation signal. The driver circuitry 105 monitors power supplied to the lens cover system 110 responsive to characteristics of the excitation signal. In some examples, the driver circuitry 105 determines characteristics of the lens cover system 110 based on the characteristics of the excitation signal. The driver circuitry 105 may modify at least one of the frequency, phase, or amplitude of the excitation signal to modify the power supplied to the lens cover system 110. The driver circuitry 105 may modify the excitation signal to increase the power efficiency, determine an impedance of the transducer 150, account for variations in an impedance of the lens cover system 110, modify power consumed by the lens cover system 110, determine a temperature of the lens cover system 110, etc.

The lens cover system 110 of FIG. 1 has first and second terminals coupled to the driver circuitry 105. The lens cover system 110 receives the excitation signal from the driver circuitry 105. The lens cover system 110 removes example contaminants 160 responsive to supplying the excitation signal to the transducer 150. For example, the lens cover system 110 vibrates the lens cover 155 responsive to the excitation signal supplied to the transducer 150. In such examples, the vibrations of the lens cover system 110 causes the contaminants 160 to be removed, thereby providing the camera lens 145 a clearer field of view. Accordingly, the lens cover system 110 reduces or eliminates the number of contaminants 160 obstructing the field of view of the camera lens 145.

The controller circuitry 115 of FIG. 1 has first and second inputs coupled to the I/V sensing circuitry 135 and first and second outputs coupled to the amplifier circuitry 120. The controller circuitry 115 generates a pre-amplifier signal representing a desired excitation signal. In some examples, the pre-amplifier signal is a pulse width modulation (PWM) signal. In such examples, the controller circuitry 115 uses modulation techniques to generate the PWM signal based on a sinusoidal waveform representing a lower power version of the excitation signal. In other examples, the controller circuitry 115 generates the pre-amplifier signal as the lower power version of the excitation signal. In such examples, the frequency of the pre-amplifier signal is approximately equal to the frequency of the excitation signal, and the amplitude of the pre-amplifier signal is proportional to the amplitude of the excitation signal. The controller circuitry 115 supplies the pre-amplifier signal to the amplifier circuitry 120.

The controller circuitry 115 of FIG. 1 receives a sense current ($I_{SENSE}$) and a sense voltage ($V_{SENSE}$) from the I/V sensing circuitry 135 responsive to supplying the pre-amplifier signal to the amplifier circuitry 120. The controller circuitry 115 receives a plurality of the sense currents and voltages across a duration of time that the excitation signal is supplied to the lens cover system 110. The controller circuitry 115 determines an impedance of the lens cover system 110 based on the plurality of sensed currents and voltages. The controller circuitry 115 determines character-istics of the lens cover system 110 based on the determined impedance and the characteristics of the excitation signal being supplied. In some examples, the controller circuitry 115 detects changes to number the contaminants 160 respon-sive to changes in the determined impedance. In other examples, the controller circuitry 115 determines a tempera-ture of the transducer 150 responsive to the determined impedance.

In some examples, the controller circuitry 115 of FIG. 1 modifies the characteristics of the excitation signal respon-sive to the determined impedance. In such examples, the controller circuitry 115 may increase power efficiency by modifying the excitation signal specific to the impedance of the lens cover system 110. In other examples, the controller circuitry 115 modifies the characteristics of the excitation signal to perform a variety of operations. For example, an excitation signal may have a specific amplitude, frequency, phase, duration responsive to the controller circuitry 115 performing a cleaning operation. The controller circuitry 115 may determine characteristics, such as impedance, of the lens cover system 110 using the sense current and voltage from the I/V sensing circuitry 135. Also, the con-troller circuitry 115 may modify characteristics of the pre-amplifier signal to modify characteristics of the excitation signal responsive to the determined characteristics of the lens cover system 110.

The amplifier circuitry 120 of FIG. 1 has first and second inputs coupled to the controller circuitry 115 and first and second outputs coupled to the filter circuitry 125. The amplifier circuitry 120 receives the pre-amplifier signal from the controller circuitry 115. The amplifier circuitry 120 amplifies the pre-amplifier signal to generate a higher power signal. In some examples, if the pre-amplifier signal is a PWM signal, the higher power signal is a PWM signal of a higher voltage level. A PWM signal is a signal that changes from a logical one to a logical zero with varying widths to represent the amplitude of an analog signal. A logical one of the pre-amplifier signal may be three volts (V), and a logical one of the higher power signal may be fifty volts. A logical one is also referred to as a logic high voltage, and a logical zero is also referred to as a logic low voltage. In other examples, if the pre-amplifier signal is a sinusoidal wave-form, the higher power signal is a sinusoidal waveform of approximately the same frequency and phase as the pre-amplifier signal. However, the amplitude of the higher power signal is an amplified version of the pre-amplifier signal. For example, the pre-amplifier signal may have an amplitude of two volts, and the higher power signal may have an amplitude of one-hundred volts.

In example operation, the controller circuitry 115 of FIG. 1 may operate in a first power domain, and the amplifier circuitry 120 operates in the second power domain. Such a differentiation of power domains may decrease the cost of the controller circuitry 115, and the amplifier circuitry 120 remains capable of supplying a higher power signal. The amplifier circuitry 120 supplies the higher power signal to the filter circuitry 125. Accordingly, the amplifier circuitry 120 allows for generation of an excitation signal having a voltage greater than voltages of the controller circuitry 115.

The filter circuitry 125 of FIG. 1 has first and second inputs coupled to the amplifier circuitry 120 and first and second outputs coupled to lens cover system 110 and the I/V sensing circuitry 135. The filter circuitry 125 receives the higher power signal from the amplifier circuitry 120. The filter circuitry 125 filters the higher power signal to generate the excitation signal. In some examples, such as if the pre-amplifier signal is a PWM signal, the filter circuitry 125 averages high-speed duty cycles of the higher power signal to generate the excitation signal as a sinusoidal waveform. In other examples, if the pre-amplifier signal is sinusoidal, the filter circuitry 125 removes frequencies greater than a cut-off frequency from the higher power signal. The filter circuitry 125 supplies the excitation signal to the lens cover system 110. Alternatively, the filter circuitry 125 may be modified or removed from the driver circuitry 105 based on the amplifier circuitry 120. For example, if the amplifier circuitry 120 is a Class D amplifier, the filter circuitry 125 converts the PWM signal to a sinusoidal excitation signal. However, if the amplifier circuitry 120 is a linear amplifier, and the pre-amplifier signal is a sinusoidal signal, the filter circuitry 125 may not be needed.

The I/V sensing circuitry 135 of FIG. 1 has first, second, and third inputs coupled to the lens cover system 110, the filter circuitry 125, and the sense resistor 130. The I/V sensing circuitry 135 has a first and second output coupled to the controller circuitry 115. The I/V sensing circuitry 135 receives a reference voltage based on the voltage difference across the sense resistor 130. The I/V sensing circuitry 135 receives an excitation voltage as a voltage of the excitation signal from the filter circuitry 125. The I/V sensing circuitry 135 converts the reference voltage and the excitation voltage from the power domain of the amplifier circuitry 120 to the power domain of the controller circuitry 115. In some examples, the I/V sensing circuitry 135 divides at least one of the reference voltage or the excitation voltage to step-down the voltages to the power domain of the controller circuitry 115.

The I/V sensing circuitry 135 of FIG. 1 generates the sense current and sense voltage as single ended versions of the differentially sensed reference and excitation voltages. The I/V sensing circuitry generates the single ended voltages in the power domain of the controller circuitry 115. In some examples, the I/V sensing circuitry 135 generates the sense current and voltage in reference to a common potential (e.g., ground). The voltage of the sense current is proportional to the voltage difference across the sense resistor 130. Accord-ingly, the voltage of the sense current represents the current of the excitation signal. The voltage of the sense voltage is proportional to the voltage of the excitation signal. Accord-ingly, the voltage of the sense voltage represents the voltage of the excitation signal. The I/V sensing circuitry 135 supplies the sense current and voltage to the controller circuitry 115.

The PCB 140 of FIG. 1 is coupled to the driver circuitry 105 and the transducer 150. The PCB 140 includes a photo diode (PD) 175 (also referred to as photo diode circuitry) that converts an optical input to an electrical signal. The photo diode 175 may capture images of the field of view of the camera lens 145. The PCB 140 couples the transducer 150 to the output of the filter circuitry 125. Alternatively, the transducer 150 may be directly coupled to the output of the filter circuitry 125 or the amplifier circuitry 120.

The camera lens 145 of FIG. 1 is coupled to the photo diode 175. The camera lens 145 supplies optical light to the photo diode 175. In some examples, the camera lens 145 increases the field of view of the photo diode 175 using optical techniques. The camera lens 145 may include a plurality of lenses to at least one (e.g., one or both) of focus or modulate light towards the photo diode 175. In some examples, the camera lens 145 and the photo diode 175 are included in a camera system.

The transducer 150 of FIG. 1 is coupled to the lens cover 155, the housing 165, and the seal 170. Alternatively, the transducer 150 may be coupled directly to the camera lens 145, the housing 165 and the seal 170. The transducer 150 receives the excitation signal from the driver circuitry 105. The transducer 150 converts power, supplied by the excitation signal, to mechanical motion corresponding to physical vibration. At least one (e.g., one or both) of the lens cover 155 or the camera lens 145 vibrates responsive to the mechanical motion of the transducer 150. The contaminants 160 move responsive to the physical vibration of the transducer 150. In some examples, the transducer 150 is a piezoelectric component. As further described below in conjunction with FIGS. 3, 7, 11, and 15, the transducer 150 can be a ring or cylindrical transducer. In some examples, the vibration of the transducer 150 at a particular frequency creates nodal points. A nodal point is a location of the lens cover 155 or lens 145 that has zero displacement. Accordingly, the driver circuitry 105 may output an excitation signal at different frequencies causing the transducer 150 to vibrate at different frequencies. Because the nodal point locations change at the different frequencies, adjusting the frequency of the excitation signal facilitates the removal of contaminates at nodal points of the lens 145 or less cover 155 corresponding to a single frequency.

Modifying characteristics of the excitation signal allows the driver circuitry 105 of FIG. 1 to control the mechanical motions of the transducer 150. The driver circuitry 105 may generate excitation signals that have a wide range of characteristics to remove the contaminants 160 from the lens cover 155. During example operations, an impedance of transducer 150) may vary as the contaminants 160 are removed or as additional contaminants are added to the lens cover 155. For example, the camera cover system 110 implemented in a vehicle may cause the lens cover 155 to be exposed to additional contaminants as the vehicle is in motion. In such an example, the driver circuitry 105 may modify the power supplied to the camera cover system 110 as the impedance of the transducer 150 varies. The driver circuitry 105 determines the changes in the impedance responsive to sense currents and voltages of the excitation signal.

In example operations, excessive thermal accumulation is responsive to the transducer 150 of FIG. 1 consuming power. In such examples, thermal accumulation increases a temperature of the transducer 150. The impedance of the transducer 150 varies as the temperature of the transducer 150 changes. Accordingly, changes of the impedance of transducer 150 are temperature dependent. The driver circuitry 105 may detect changes in the temperature of the transducer 150 responsive to variations of the impedance.

The housing 165 of FIG. 1 is coupled to the seal 170. The housing 165 houses the transducer 150 and the lens cover 155, such that the PCB 140, the camera lens 145, and the photo diode 175 are protected from exposure to the contaminants 160. The seal 170 is coupled between the housing 165 and transducer 150 and between the housing 165 and the lens cover 155. The seal 170 prevents the contaminants 160 from reaching the camera lens 145 and the photo diode 175. As further described below, the seal 170 is implemented using an adhesive, as opposed to a gasket. Also as further described below, a bracket is used to attach the lens 145 or the lens cover 155 to the housing. The bracket provides a waterproof seal to prevent the contaminants 160 from entering the interior of the housing 165.

Figure 2:
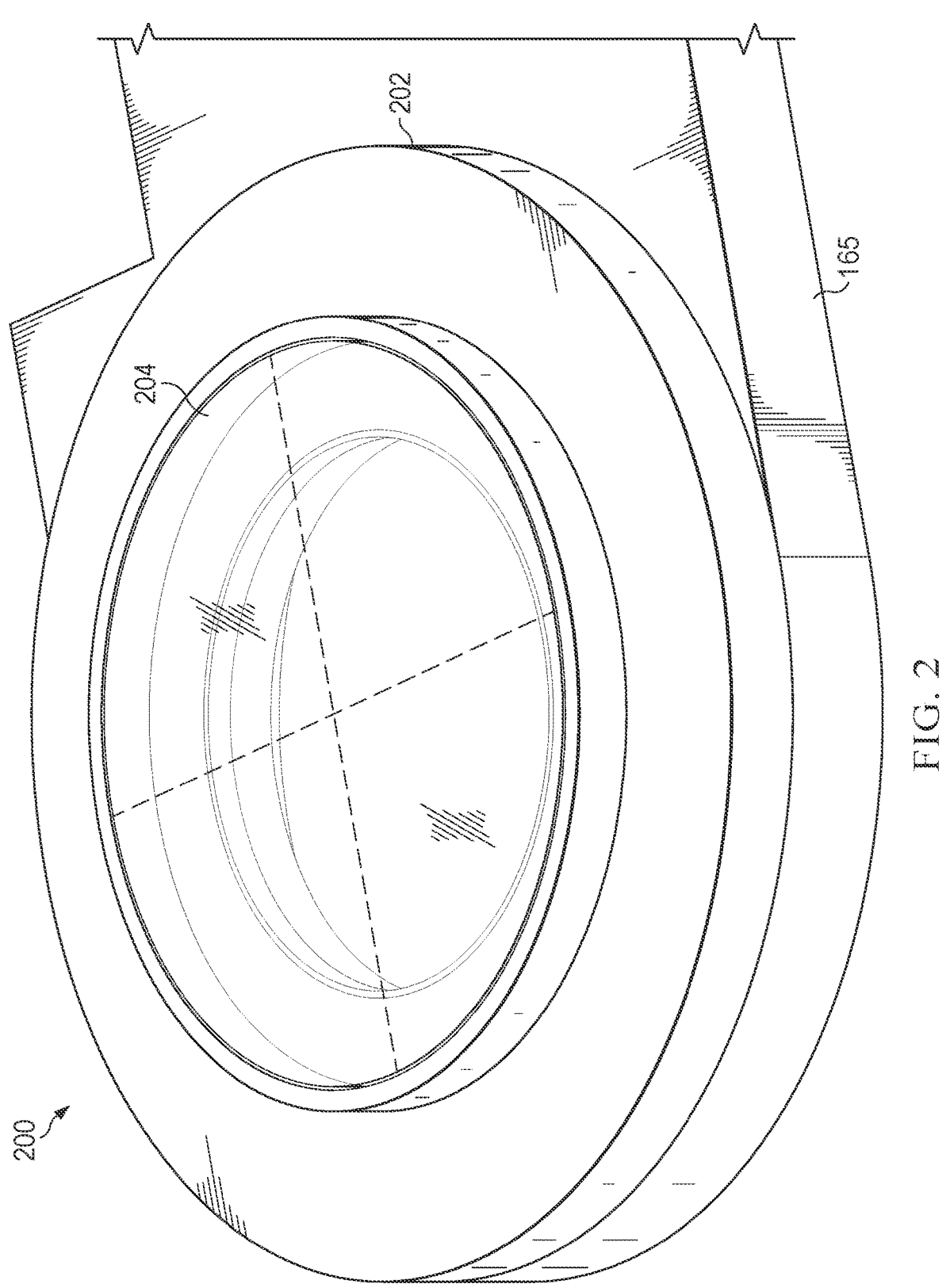
FIG. 2 is a perspective view of an example implementation of the lens cover system of FIG. 1.

FIG. 2 is a perspective view of an example flat lens implementation of the lens cover system 110 of FIG. 1. The example lens cover system 200 of FIG. 2 includes the example housing 165 of FIG. 1. The lens cover system 200 further includes an example bracket 202 and an example lens 204. The lens 204 corresponds to the lens 145 of FIG. 1. In some examples, although the lens cover system 200 of FIG. 2 does not include a lens cover, the lens 204 of FIG. 2 could be replaced with the lens cover 155 of FIG. 1, with the lens 145 being within the housing 165 and the bracket 202 beneath the lens cover 155 (with respect to the orientation of FIG. 2). In some examples, the lens 145, the bracket 202, and the transducer 150) correspond to the lens cover 155 of FIG. 1. Although the example lens cover system 200 is illustrated with particular shapes and dimensions, the shape or dimensions of one or more components of the lens cover system 200 may be different.

The example bracket 202 of FIG. 2 is a lateral bracket having an opening (e.g., a circular opening) to house the lens 204 and extends radially to interface directly with the housing 165. In some examples, the housing 165 is or includes a lens barrel to interface with the bracket 202. In some examples the bracket 202 can be connected to the housing 165 using a cap that can be tightened to hold bracket 202 firmly in place without concern of tightness level. For example, the bracket 202 can be connected to the housing 165 using one or more screws, bolts, clamps, adhesive, or any other technique(s) for connecting components. In some examples, the bracket 202 can be integrated directly into the housing 165. In such examples, the bracket 202 and the housing 165 are incorporated into one component. As further described below; adhesive is used to provide a watertight seal between the bracket 202 and the lens 204. The bracket 202 includes a circular base to interface with the housing 165 and a circular holding portion that houses the lens 204. However, if the lens is a different shape, the holding portion that houses the lens 204 will also be different to be able to properly hold the lens 204. Also, the circular base on the bracket 202 may be a different shape. The example lens 204 of FIG. 2 is a disk-shaped lens (e.g., flat and circular). However, the lens may correspond to a different shape.

Figure 3:
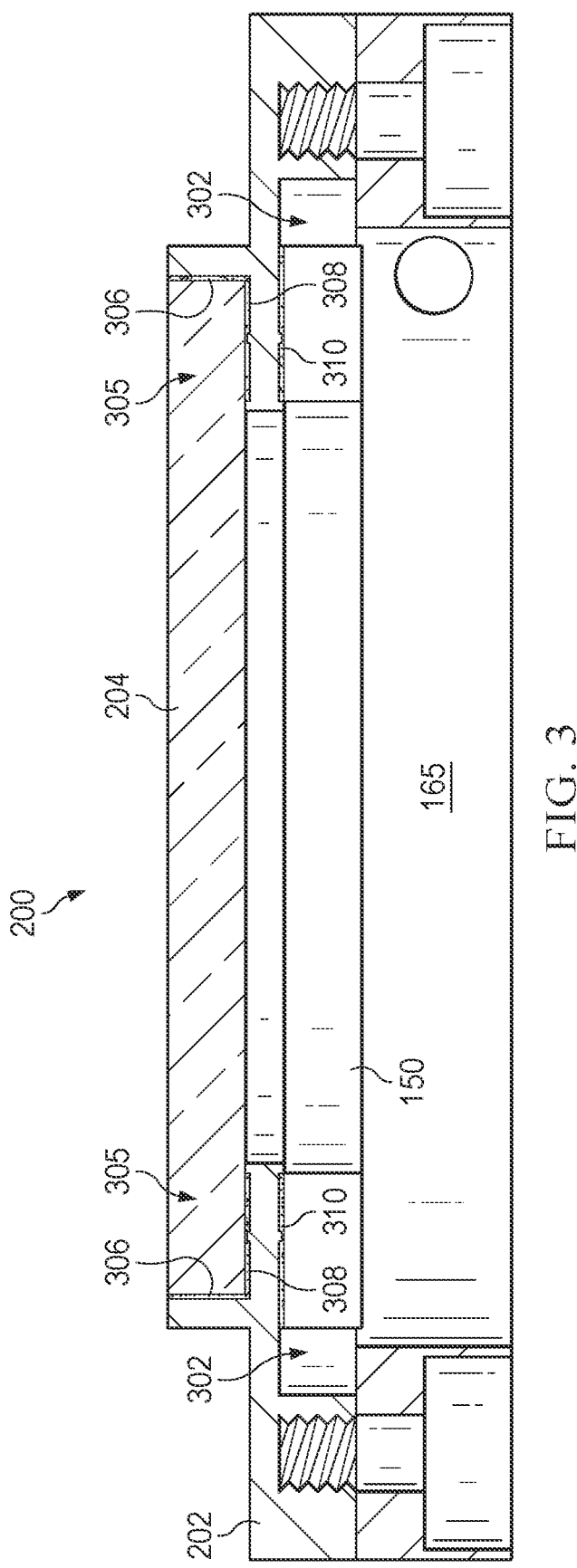
FIG. 3 is a cross-sectional view of the example implementation of the lens cover system of FIG. 2.

FIG. 3 is a cross sectional view of the lens cover system 200 of FIG. 2. The example lens cover system 200 of FIG. 3 includes the transducer 150 and the example housing 165 of FIGS. 1 and 2. The lens cover system 200 of FIG. 3 further includes the example bracket 202, which includes an example L-shaped portion 305, and the example lens 204 of FIG. 2. The example lens cover system 200 of FIG. 3 further includes an example empty space or vacuum 302 (e.g., also referred to as excess space), an example L-shaped portion 305, and example adhesive layers 306, 308, 310. Although the example lens cover system 200 of FIG. 3 is illustrated with particular shapes and dimensions, the shape or dimensions of one or more components of the lens cover system 200 may be different. Also, although FIG. 3 illustrates the bracket 202 coupled to the housing 165 using screws to position the bracket 202 and the transducer 150 with respect to the lens 204 and the photo diode 175 of FIG. 1, the bracket 202 may be coupled to the housing 165 using any type of coupling component. The lens covering system 200 of FIG. 3 is structured to align the lens 204, the opening of the bracket 202 and the opening of the transducer 150 to provide a path from the lens 204 to the photo diode 175 of FIG. 1.

The transducer 150 of FIG. 3 is a ring or cylindrical transducer that extends radially along the lower support of the L-shaped portion 305 of the bracket 202 and includes an opening (e.g., a circular opening) through the center of the ring. The opening provides an optical path from the lens 204 to the photo diode 175 of FIG. 1. The transducer 150 vibrates radially if activated by an excitation signal from the driver circuitry 105 of FIG. 1. As the transducer 150 vibrates radially, the transducer 150 pivots about its cross-sectional center, which causes the lens 204 and the bracket 202 to vibrate up and down with respect to the orientation shown in FIG. 3. Also, as the transducer 150 vibrates, the diameter of the transducer 150 can change (e.g., the diameter gets bigger or smaller). Thus, the bracket 202 includes, or houses, the empty space or vacuum 302 to provide space for the transducer 150 to vibrate freely. In this manner, the transducer 150 will not contact the interior sides of the bracket 202 during vibration. A surface of the transducer 150 is connected to the opposite surface of the lower support of the L-shaped portion 305 using the example adhesive layer 310. In this manner, if the transducer 150 vibrates, the bracket 202 and the lens 204 also vibrate as they are coupled to each other via the adhesive layers 306, 308, 310.

As shown in FIG. 3, the bracket 202 includes the example L-shaped portion 305. The L-shaped portion 305 includes a lower support and a side support for the lens 204 and extends radially based on the shape of the lens 204. In this manner, the lens can be housed within the L-shaped portion 305 of the bracket 202. To prevent the lens from falling out of the bracket 202 and to provide a watertight seal, the adhesive layers 306, 308 are located between the lens 204 and the side and lower supports of the L-shaped portion 305. For example, a surface of the lens 204 is connected to a surface of the L-shaped portion 305 of the bracket 202 via the adhesive layer 306. Also, a surface of the L-shaped portion 305 of the bracket 202 is connected to a surface of the lens 204 via the adhesive layer 308. The adhesive layers 306, 308 are applied throughout the radial L-shaped portion 305 to provide a 360-degree watertight seal between the radial L-shaped portion 305 and the lens 204. The adhesive layers 306, 308, 310 are made of an adhesive material, such as glue, epoxy, or any other adhesive material. The adhesive layers 306, 308, 310 are strong enough to withstand the sheer stress associated with the vibration, as further described below in conjunction with FIGS. 5A-5C.

Figure 4:
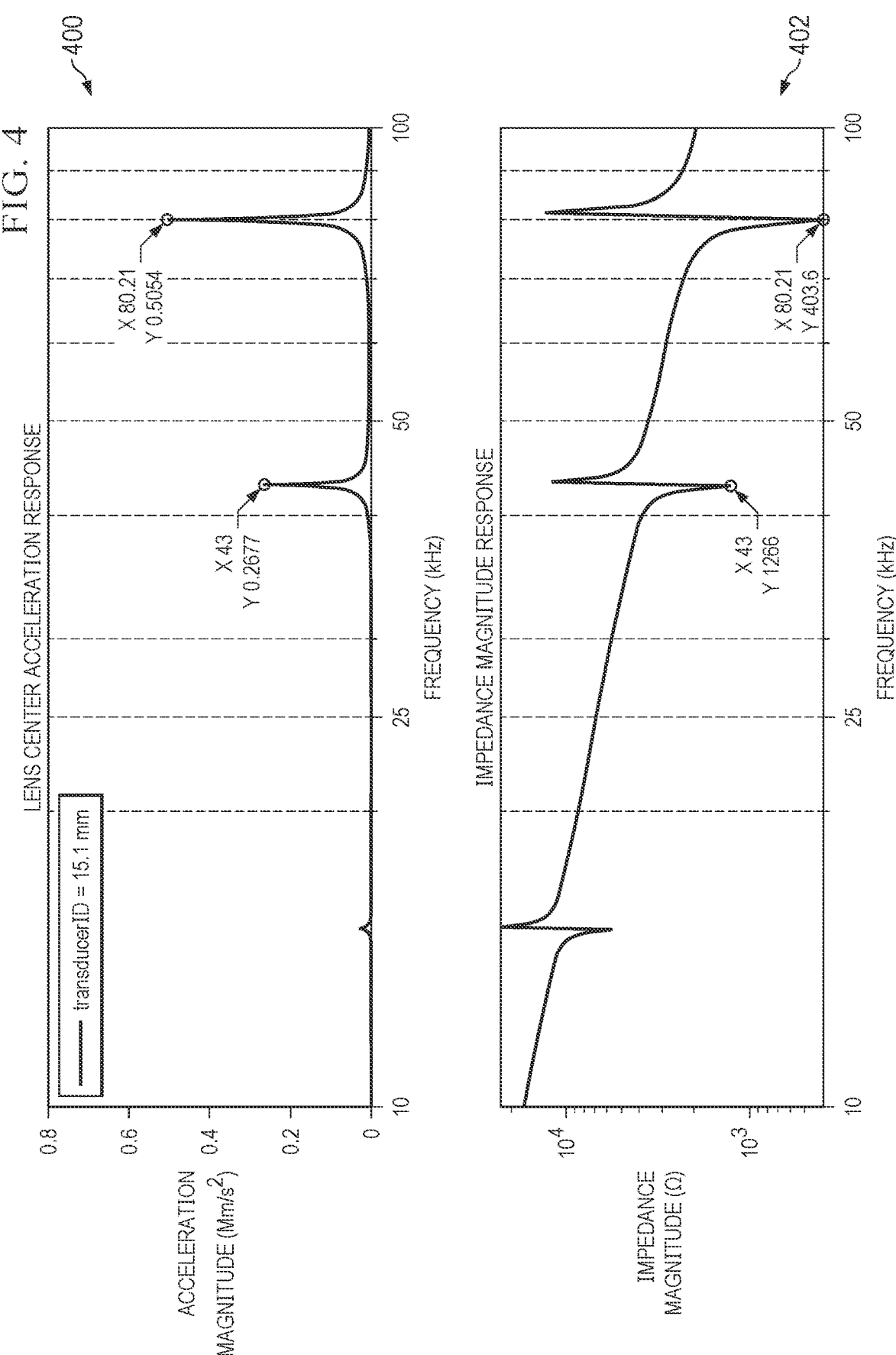
FIG. 4 illustrates example frequency response diagrams corresponding to the lens cover system of FIGS. 2 and 3.

FIG. 4 illustrates an example acceleration response 400 at the center of the lens 204 of FIGS. 2-3 and an example impedance magnitude response 402 for the lens cover system 200. The responses 400, 402 are based on at least one of the characteristics of the lens 204 or external characteristics.

As shown in FIG. 4, the magnitude of the impedance corresponds to the magnitude of the acceleration. For example, as the impedance magnitude response 402 decreases, the acceleration magnitude response 400 increases. At the 43 kilohertz (KHz) frequency of the excitation signal, the magnitude of the impedance decreases to about 1266 Ohms. The decrease in impedance causes the acceleration magnitude to increase to 0.2677 megameters per second squared (Mm/s$^2$). Because 0.2677 Mm/s$^2$ is sufficient for expelling water from the lens 204, an excitation signal at 43 kHz causes the transducer 150 to vibrate and expel liquid from the lens 204. Also, at the 80.21 KHz frequency of the excitation signal, the magnitude of the impedance decreases to about 403.6 Ohms. The decrease in impedance causes the acceleration magnitude to increase to 0.5054 Mm/s$^2$. Because 0.5054 Mm/s$^2$ is sufficient for expelling water from the lens 204, an excitation signal at 80.21 kHz causes the transducer 150 to vibrate and expel liquid from the lens 204. As described above, although either frequency can be used to excite the transducer 150, both frequencies may result in different mode shapes and corresponding nodal points at different locations outside of the center of the lens. Accordingly, the driver circuitry 105 may alternate the excitation signal between the two frequencies to avoid nodal points on the lens 204.

Figure 5A:
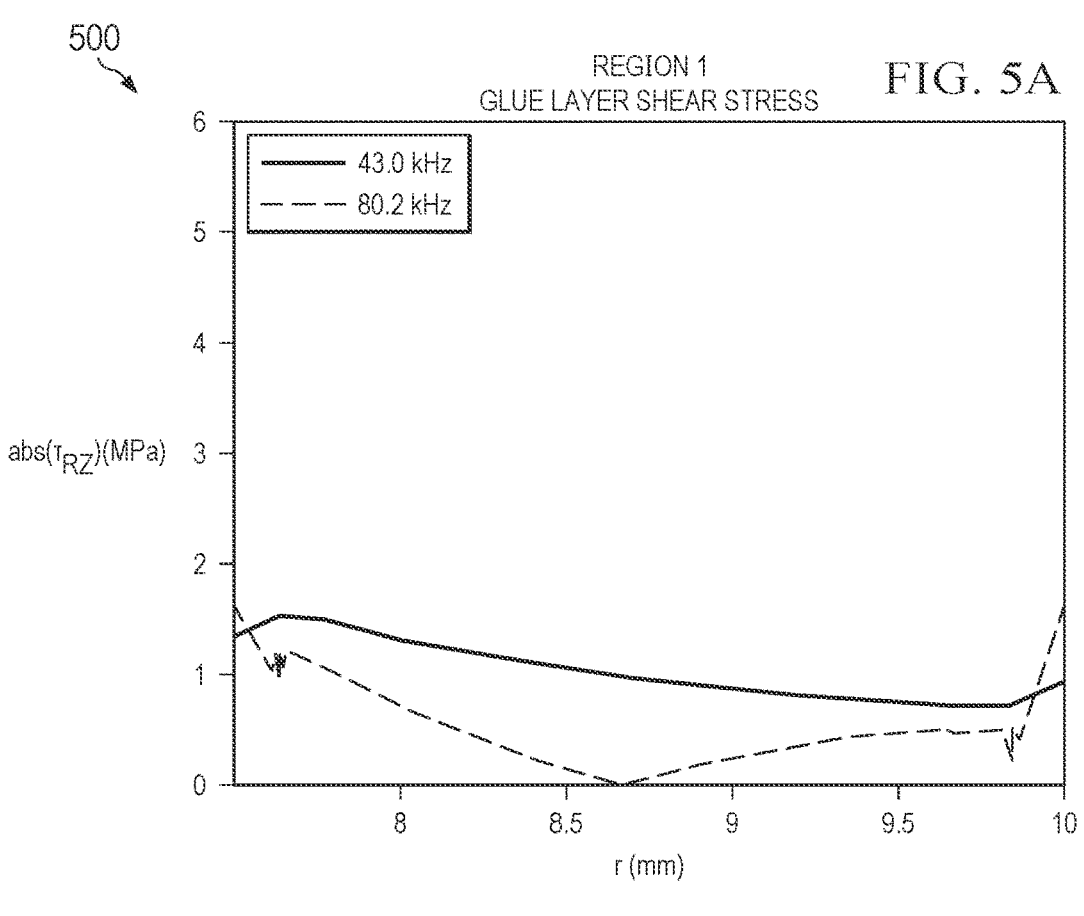
Figure 5B:
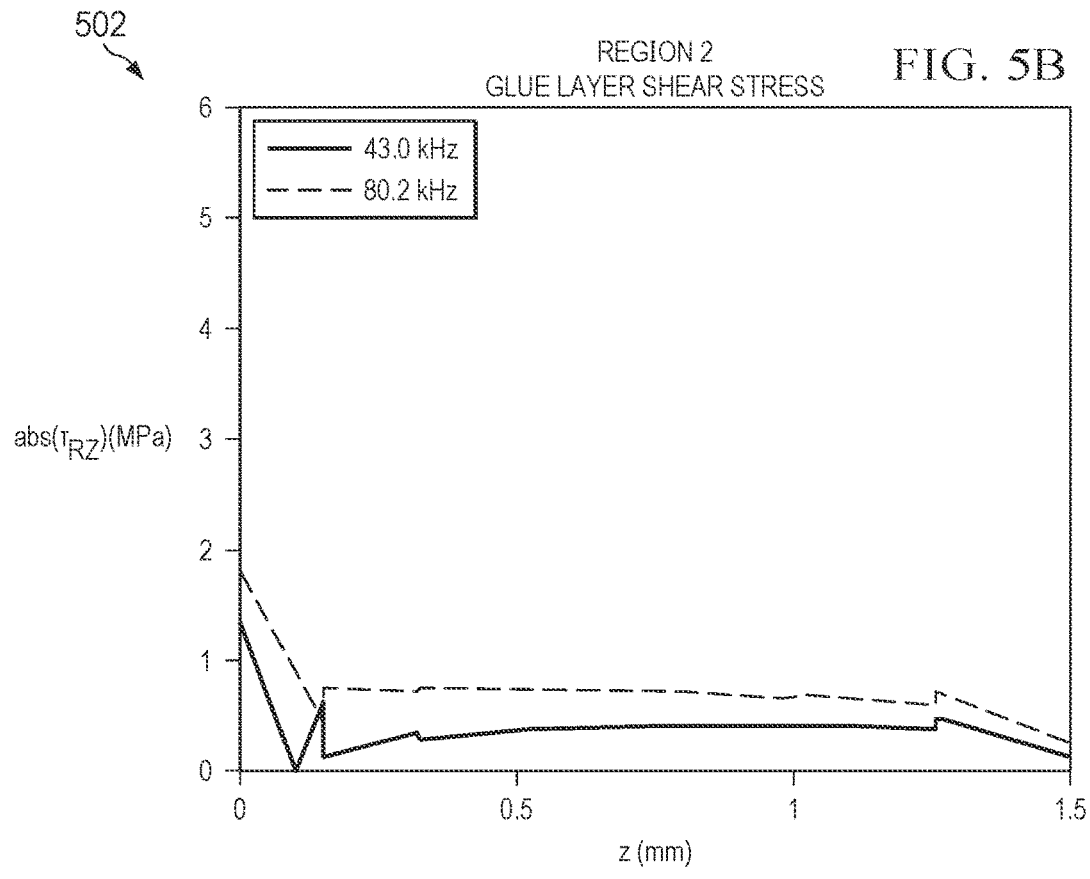

FIGS. 5A-5C illustrate the adhesive shear stress levels for the adhesive layers 306, 308, 310 of FIG. 3. The first example plot 500 corresponds to the adhesive sheer stress level of the adhesive layer 308. The second example plot 502 corresponds to the adhesive sheer stress level of the adhesive layer 306. The third example plot 504 corresponds to the adhesive sheer stress level of the adhesive layer 310.

The lap shear stress (also referred to as the maximum threshold shear stress) of the adhesive layer is the amount of stress that causes the adhesive to no longer adhere two components. The lap shear stress of the adhesive layer may be based on characteristics of the adhesive and environmental characteristics. For example, the type, age, amount etc. of glue, epoxy, etc. and the environmental temperature, humidity, etc., may factor into the lap shear stress of the adhesive layer. In general, the threshold amount of sheer stress that is acceptable may be any sheer stress below 7.6 Mega Pascals (MPa) which the lap sheet stress being closer to about 13.8 MPa. The plots 500, 502, 504 illustrate the adhesive layer sheer stresses throughout the respective layers at the two excitation frequencies identified in FIG. 4 (e.g., 43 KHz and 80.2 kHz). As shown in the plots 500, 502, 504, none of the sheer stress levels exceed 2 MPa at any point across the adhesive layers 306, 308, 310. Thus, there is minimal risk in a lap shear event using the adhesive layers 306, 308, 310 of FIG. 3.

Figure 6:
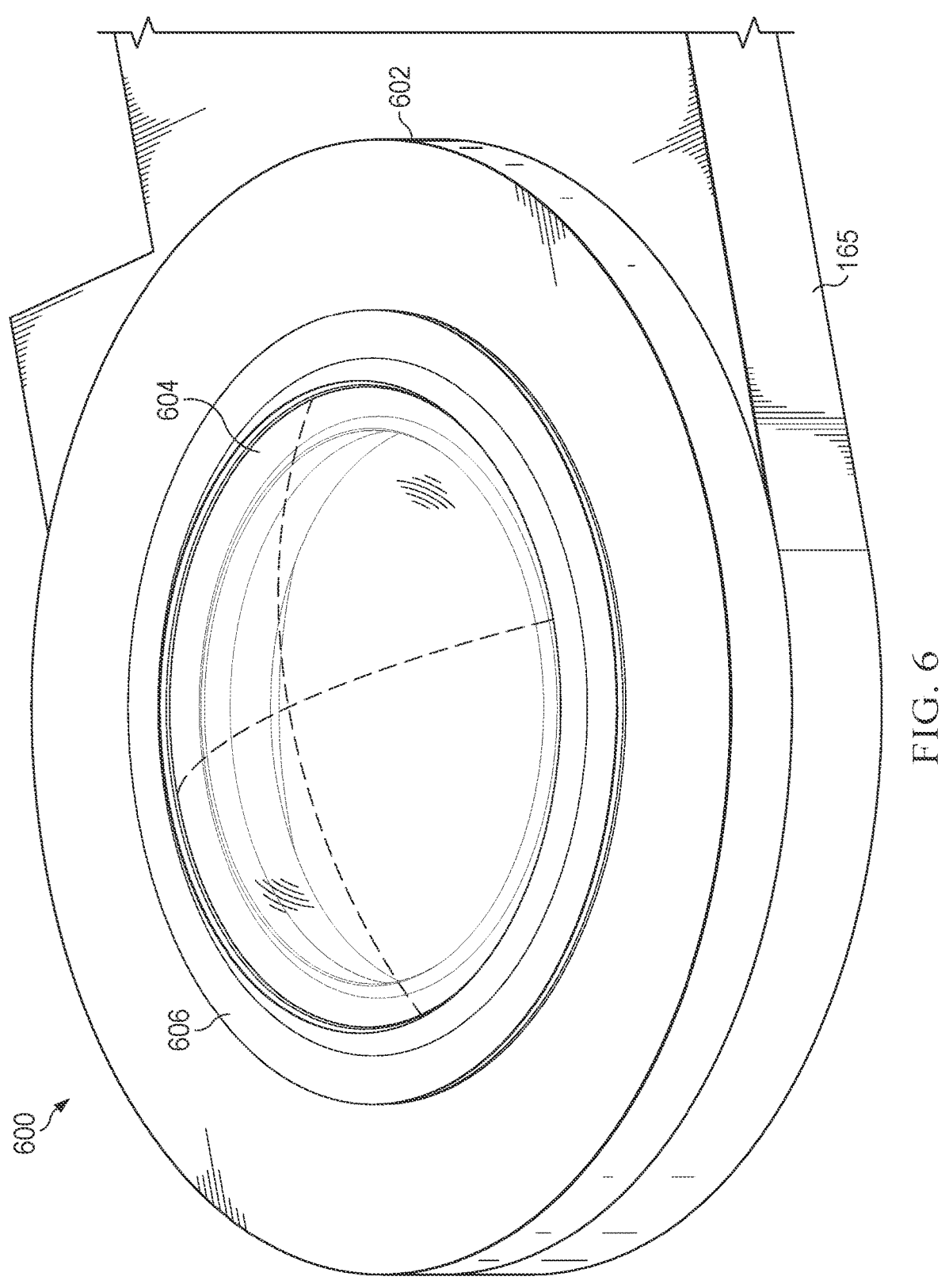
FIG. 6 is a perspective view of an alternative example implementation of the lens cover system of FIG. 1.

FIG. 6 is a perspective view of an example covered lens implementation of the lens cover system 110 of FIG. 1. The example lens cover system 600 of FIG. 6 includes the example housing 165 of FIG. 1. The lens cover system 600 further includes an example bracket 602, an example lens 604, and an example ring bracket 606. The lens 604 corresponds to the lens 145 of FIG. 1. In some examples, although the lens cover system 600 of FIG. 6 does not include a lens cover, the lens 604 of FIG. 6 could be replaced with the lens cover 155 of FIG. 1, with the lens 145 being within the housing 165 and the bracket 602 beneath the lens cover 155. In some examples, the lens 604, the bracket 602, and the transducer 150 correspond to the lens cover 155 of FIG. 1. Although the example lens cover system 600 is illustrated with particular shapes and dimensions, the shape or dimensions of one or more components of the lens cover system 600 may be different.

The example bracket 602 of FIG. 6 is a lateral bracket that has an opening (e.g., a circular opening) that houses the lens 604 and extends radially to interface directly with the housing 165. In some examples, the housing 165 is or includes a lens barrel to interface with the bracket 602. In some examples the bracket 602 can be connected to the housing 165 using a cap that can be tightened to hold the bracket 602 firmly in place without concern of tightness level. For example, the bracket 602 can be connected to the housing 165 using one or more screws, bolts, clamp, adhesive, or any other technique for connecting components. In some examples, the bracket 602 can be integrated directly into the housing 165. In such examples, the bracket 602 and the housing 165 are incorporated into one component. As further described below, adhesive is used to provide a watertight seal between the bracket 602 and the lens 604. The bracket 602 includes a circular base to interface with the housing 165 and a circular holding portion that houses the lens 604. However, if the lens is a different shape, the holding portion that houses the lens 604 can also be different to be able to properly hold the lens 604. Also, the circular base on the bracket 602 may be a different shape.

The example lens 604 of FIG. 6 is a curved disk-shaped lens (e.g., a concave lens, a curved lens, etc.). However, the lens may correspond to a different shape that is not flat. The curved shaped lens 604 provides a different field of view to the flat lens 204 of FIGS. 2 and 3. Because the lens 604 is a curved, disk-shaped lens, the bracket 602 does not include the L-shaped portion 305 of FIG. 3. Rather, the bracket 602 includes the example ring bracket 606 that has an opening (e.g., a circular opening) to house the lens 604 in the bracket 602. The ring bracket 606 secures the lens 604 to the bracket 602 using adhesive, as further described below in conjunction with FIGS. 7A-7B.

Figure 7A:
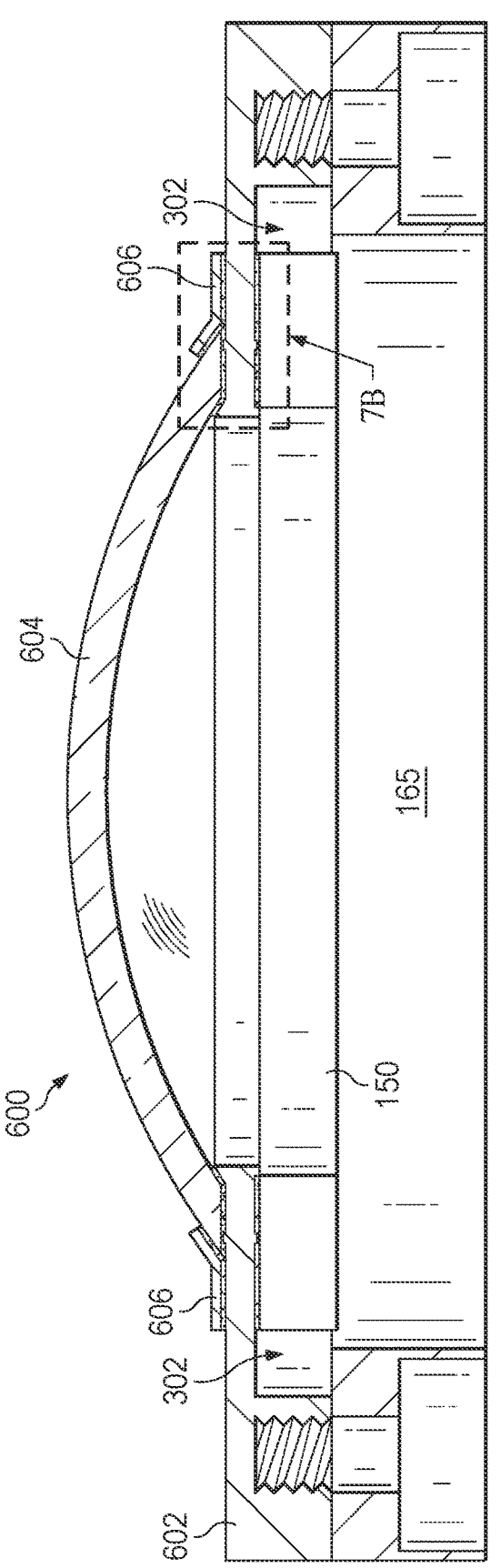
FIGS. 7A and 7B illustrate a cross-sectional view of the example implementation of the lens cover system of FIG. 6.
Figure 7B:
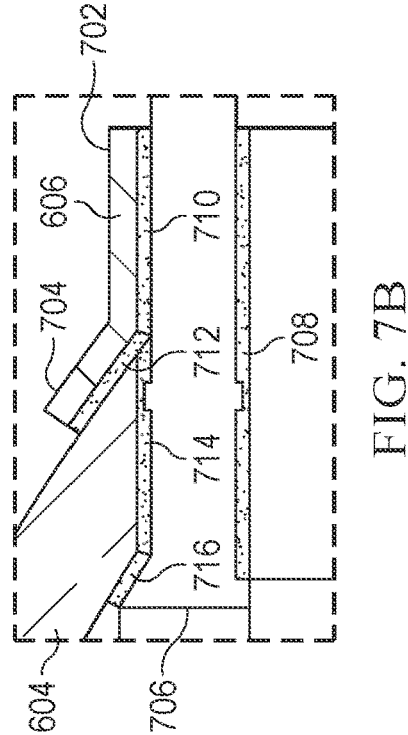

FIGS. 7A-7B illustrate a cross sectional view of the lens cover system 600 of FIG. 6. The example lens cover system 600 of FIGS. 7A-7B includes the transducer 150 and the example housing 165 of FIGS. 1, 2, 3 and 6 and the empty space or vacuum 302 of FIG. 3. The lens cover system 600 of FIGS. 7A-7B further includes the example bracket 602, the example lens 604, and the ring bracket 606 of FIG. 6. The example lens cover system 600 of FIGS. 7A-7B further includes an example ring-shaped plate 702 (also referred to as a ring plate), example transition surfaces 704, 706, and example adhesive layers 708, 710, 712, 714, 716. Although the example lens cover system 600 of FIGS. 7A-7B is illustrated with particular shapes and dimensions, the shape or dimensions of one or more components of the lens cover system 600 may be different. Also, although FIGS. 7A-7B illustrates the bracket 602 coupled to the housing 165 using screws to position the bracket 602 and the transducer 150 with respect to the lens 604 and the photo diode 175 of FIG. 1, the bracket 602 may be coupled to the housing 165 using any type of coupling component. The lens covering system 600 of FIGS. 7A-7B is structured to align the lens 604, the opening of the bracket 602, the opening of the ring bracket 606, and the opening of the transducer 150 to provide a path from the lens 604 to the photo diode 175 of FIG. 1.

The transducer 150 of FIGS. 7A-7B is a ring or cylindrical transducer that extends radially along the bottom of the bracket 602 (e.g., with respect to the orientation of FIGS. 7A-7B) and includes an opening (e.g., a circular opening) through the center of the ring. The opening provides an optical path from the lens 604 to the photo diode 175 of FIG. 1. The transducer 150 vibrates radially if activated by an excitation signal from the driver circuitry 105 of FIG. 1. As the transducer 150 vibrates radially, the transducer 150 pivots about its cross-sectional center, which causes the lens 604 and the bracket 602 to vibrate up and down with respect to the orientation shown in FIGS. 7A-7B. Also, as the transducer 150 vibrates, the diameter of the transducer 150 can change (e.g., the transducer 150 gets bigger or smaller). Thus, the bracket 602 includes the empty space or vacuum 302 to provide space for the transducer 150 to vibrate freely. In this manner, the transducer 150 will not contact the interior sides of the bracket 602 during vibration. The transducer 150 is connected to the side of the bracket 602 opposite the side connected to the lens 604 using the example adhesive layer 708. A surface of the transducer 150 is connected to the opposite surface of the lower support of bracket 602 using the example adhesive layer 708. In this manner, if the transducer 150 vibrates, the bracket 602 and the lens 604 also vibrate as they are coupled to each other via the adhesive layers 708, 710, 712, 714, 716.

As shown in FIGS. 7A-7B, a surface of the ring bracket 606 is connected to a surface of the lateral bracket 602 using the adhesive layer 710. The ring bracket 606 includes the ringed plate 702 and the transition surface 704. As shown in FIG. 6, the ring bracket 606 extends radially around the lateral bracket 602. Accordingly, the ring plate 702 and transition surface 704 extend radially around the lateral bracket 602. The ring plate 702 is a flat plate that is coupled to the lateral bracket 602 using the adhesive layer 710. The ring plate 702 extends into the transition surface 704. The transition surface 704 is also referred to as a conical plate, a conical surface, a lipped surface, or lipped plate. The transition surface 704 is an angled surface that corresponds to the angle of the curved lens 604 with respect to the lateral bracket 602. In this manner, a surface at the bottom portion (e.g., with respect to the orientation of FIGS. 7A-7B) of the transition surface 704 is coupled to a surface of the lens 604 using the adhesive layer 712. The adhesive layers 710, 712 secure the lens and provide a watertight seal. For example, the adhesive layers 710, 712 are applied throughout the ring bracket 606 to provide a 360-degree watertight seal between the ring bracket 606 and the lens 604. The adhesive layers 710, 712 are made of an adhesive material, such as glue, epoxy, or any other adhesive material. The adhesive layers 710, 712 are strong enough to withstand the sheer stress associated with the vibration, as further described below in conjunction with FIGS. 9A-9E.

In the example of FIGS. 7A-7B, a surface at the edge of the lens 604 is coupled with a surface of the bracket 602 using the adhesive layer 714. To further secure the lens 604 to the lateral bracket 602, the lateral bracket 602 includes a transition surface 706 that is an angled surface that corresponds to the angle of the curved lens 604 with respect to the lateral bracket 602. The top surface (e.g., with respect to the orientation of FIGS. 7A-7B) of the transition surface 706 is coupled to a surface of the lens 604 using the adhesive layer 716. The adhesive layers 714, 716 secure the lens and provide a watertight seal. For example, the adhesive layers 714, 716 are applied throughout the ring bracket 606 to provide a 360 degree watertight seal between the ring bracket 606 and the lens 604. The adhesive layers 714, 716 are made of an adhesive material, such as glue, epoxy, or any other adhesive material. The adhesive layers 714, 716 are strong enough to withstand the sheer stress associated with the vibration, as further described below in conjunction with FIGS. 9A-9E.

The lens cover system 600 of FIGS. 7A-7B provides a first watertight seal via the adhesive layers 714, 716 and a second watertight seal via the ring bracket 606 and the adhesive layers 710, 712. However, in some examples, the ring bracket 606 and the adhesive layers 710, 712 can be removed. For example, the ring bracket 606 and adhesive layers 710, 712 lower the sheet stress throughout the lens cover system 600 during vibration of the transducer 150. Accordingly, if the adhesive layers 714, 716 are strong enough to secure the lens 604 to the lateral bracket 602 during vibration of the transducer 150, the ring bracket 606 can be removed. For example, if the transducer 150 operates at a lower frequency, it may be possible to secure the lens 604 to the bracket 602 without the ring bracket 606. However, if the transducer 150) operates at a high frequency, the ring bracket 606 may be utilized to provide additional strength to avoid the lens 604 from breaking free from the adhesive layers 714, 716 during vibration. Alternatively, the adhesive layers 708, 714 may be removed if the adhesive layers 712, 710 provide enough sheer strength and a sufficient seal.

Figure 8:
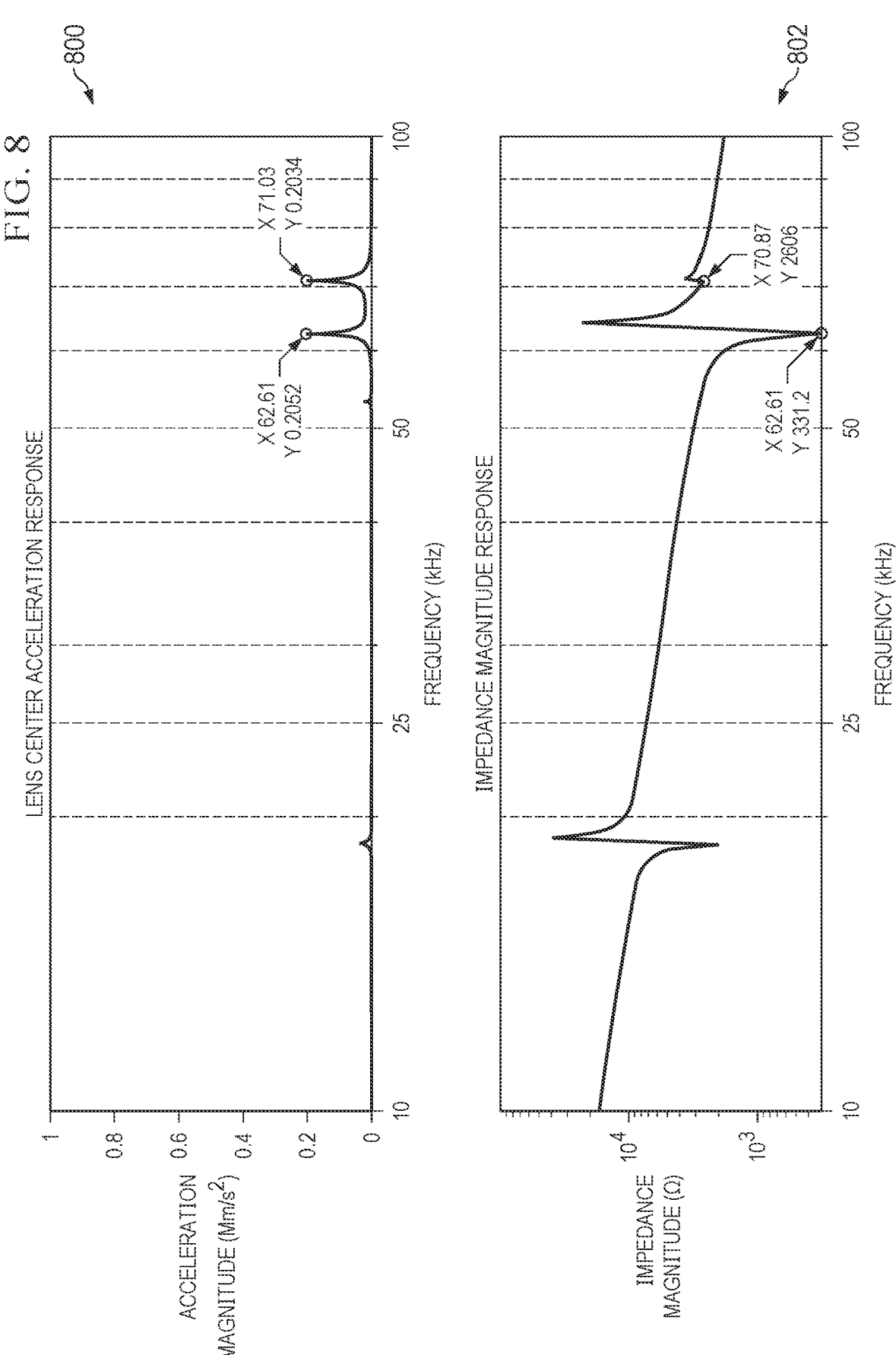
FIG. 8 illustrates example frequency response diagrams corresponding to the lens cover system of FIGS. 6 and 7A-7B.
Figure 9C:
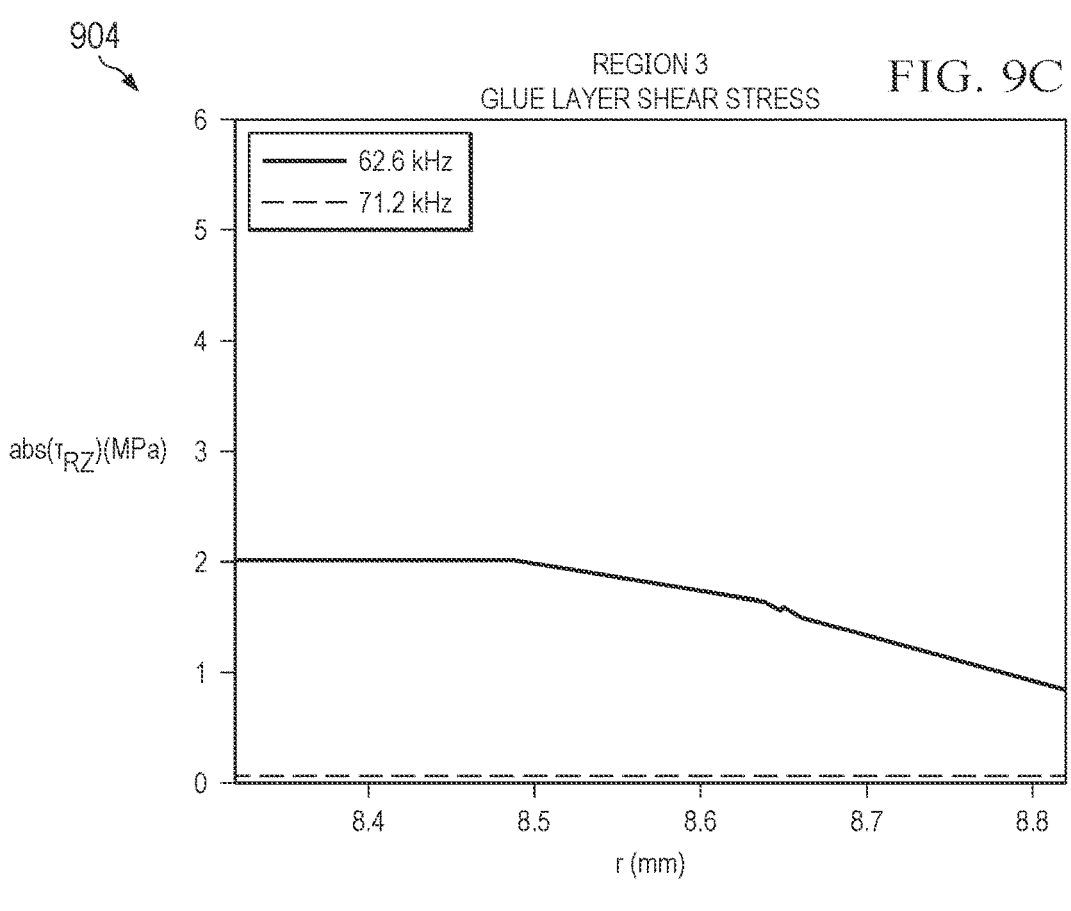
Figure 9D:
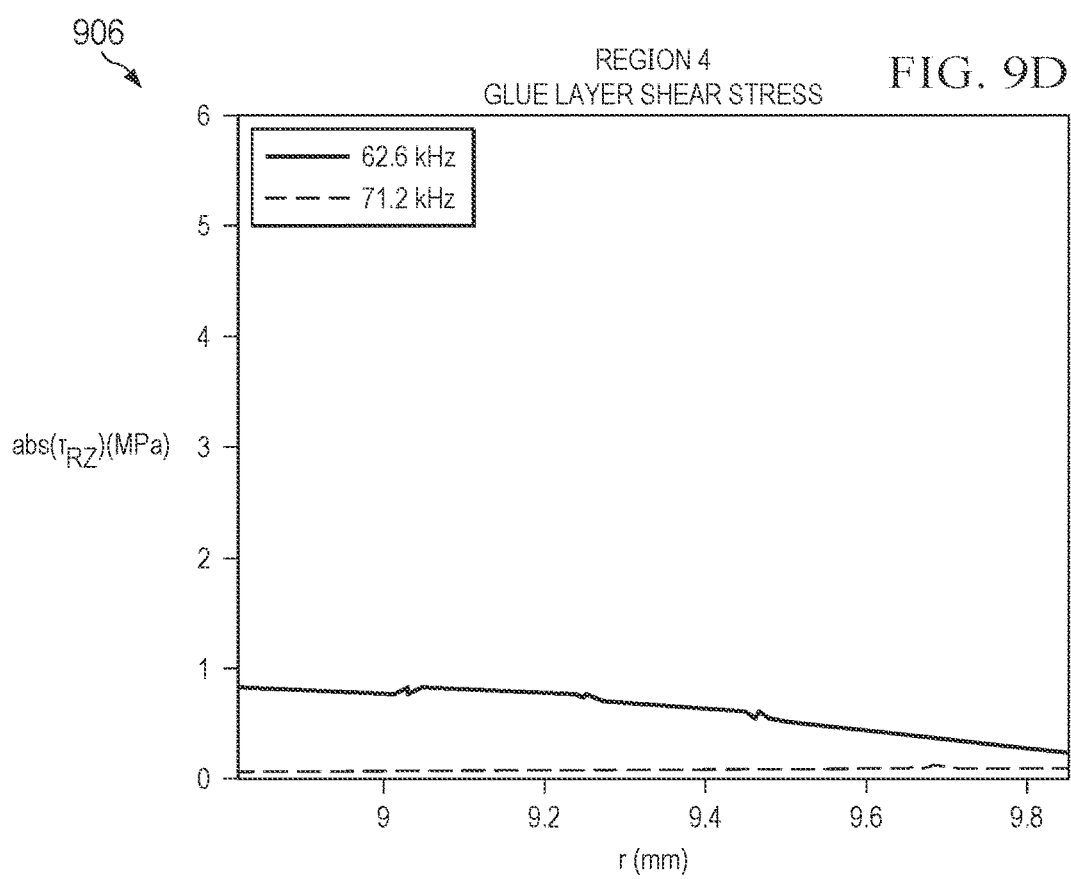
Figure 9E:
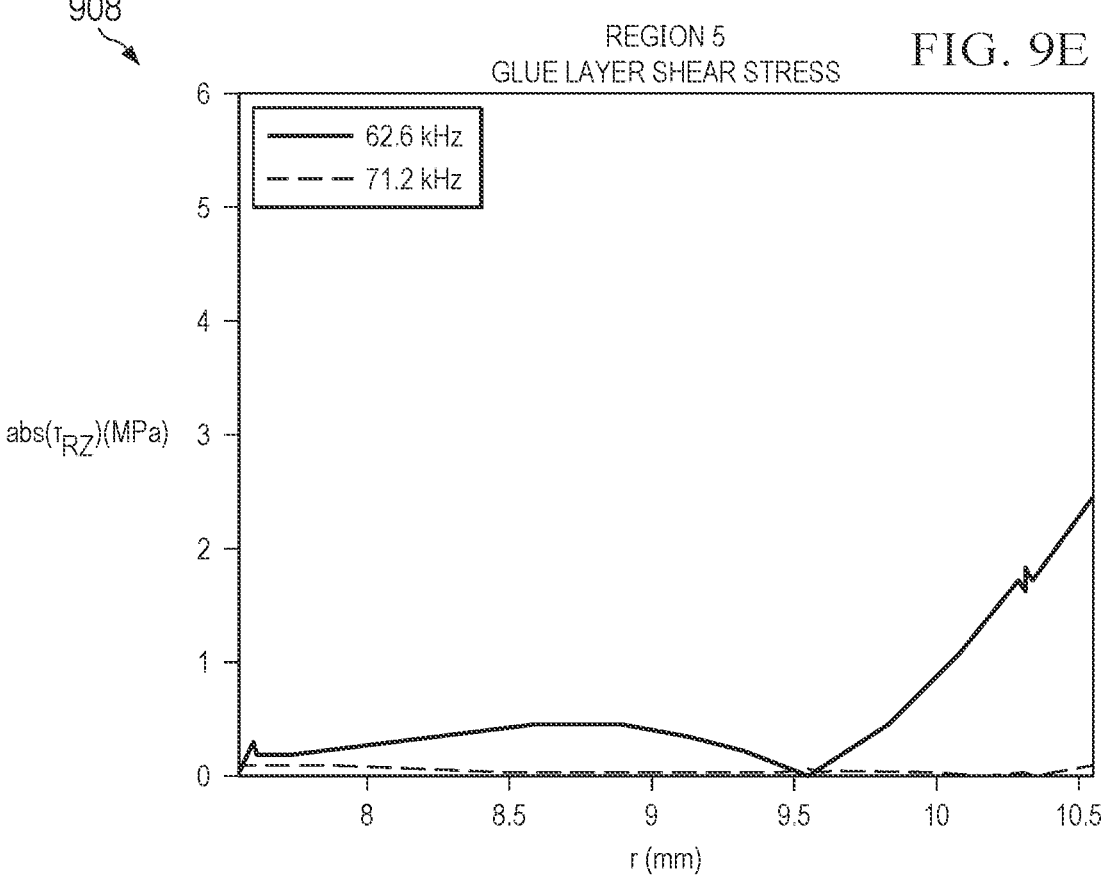

FIG. 8 illustrates an example acceleration response 800 at the center of the lens 604 of FIGS. 6-7 and an example impedance magnitude response 802 for the lens cover system 600. The responses 800, 802 are based on at least one of the characteristics of the lens 604 or external characteristics.

As shown in FIG. 8, the magnitude of the impedance corresponds to the magnitude of the acceleration. For example, as the impedance magnitude response 802 decreases, the acceleration magnitude response 800 increases. At the 62 KHz frequency of the excitation signal, the magnitude of the impedance decreases to about 331.2 Ohms. The decrease in impedance causes the acceleration magnitude to increase to 0.2052 $Mm/s^2$. Because 0.2052 $Mm/s^2$ is sufficient for expelling water from the lens 604, an excitation signal at 62.61 kHz causes the transducer 150 to vibrate and expel liquid from the lens 604. Also, at the 71.03 kHz frequency of the excitation signal, the magnitude of the impedance decreases to about 2606 Ohms. The decrease in impedance causes the acceleration magnitude to increase to 0.2034 $Mm/s^2$. Because 0.2034 $Mm/s^2$ is sufficient for expelling water from the lens 604, an excitation signal at 71.03 kHz causes the transducer 150 to vibrate and expel liquid from the lens 604. As described above, although either frequency can be used to excite the transducer 150, both frequencies may result in different mode shapes and corresponding nodal points at different locations outside of the center of the lens. Accordingly, the driver circuitry 105 may alternate the excitation signal between the two frequencies to avoid nodal points on the lens 604.

FIGS. 9A-9E illustrate the adhesive shear stress levels for the adhesive layers 708, 710, 712, 714, 716 of FIGS. 7A-7B. A first example plot 900 corresponds to the adhesive sheer stress level of the adhesive layer 716. A second example plot 902 corresponds to the adhesive sheer stress level of the adhesive layer 714. A third example plot 904 corresponds to the adhesive sheer stress level of the adhesive layer 712. A fourth example plot 906 corresponds to the adhesive sheer stress level of the adhesive layer 710. A fifth plot 908 corresponds to the adhesive sheer stress level of the adhesive layer 708.

The lap shear stress of the adhesive layer is the amount of stress that will cause the adhesive to no longer adhere two components. The lap shear stress of the adhesive layer may be based on characteristics of the adhesive and environmental characteristics. For example, the type, age, amount etc., of glue, epoxy, etc., and the environmental temperature, humidity, etc., may factor into the lap shear stress of the adhesive layer. In general, the threshold amount of sheer stress that is acceptable may be any sheer stress below 7.6 MPa which the lap sheet stress being closer to about 13.8 MPa. The plots 900, 902, 904, 906, 908 illustrate the adhesive layer sheer stresses throughout the respective layers at the two excitation frequencies identified in FIG. 8 (e.g., 62.6 kHz and 71 kHz). As shown in the plots 900, 902, 904, 906, 908, none of the sheer stress levels exceed 2.5 MPa at any point across the adhesive layers 708, 710, 712, 714, 716. Thus, there is minimal risk in a lap shear event using the adhesive layers 708, 710, 712, 714, 716 of FIGS. 7A-7B.

Figure 10:
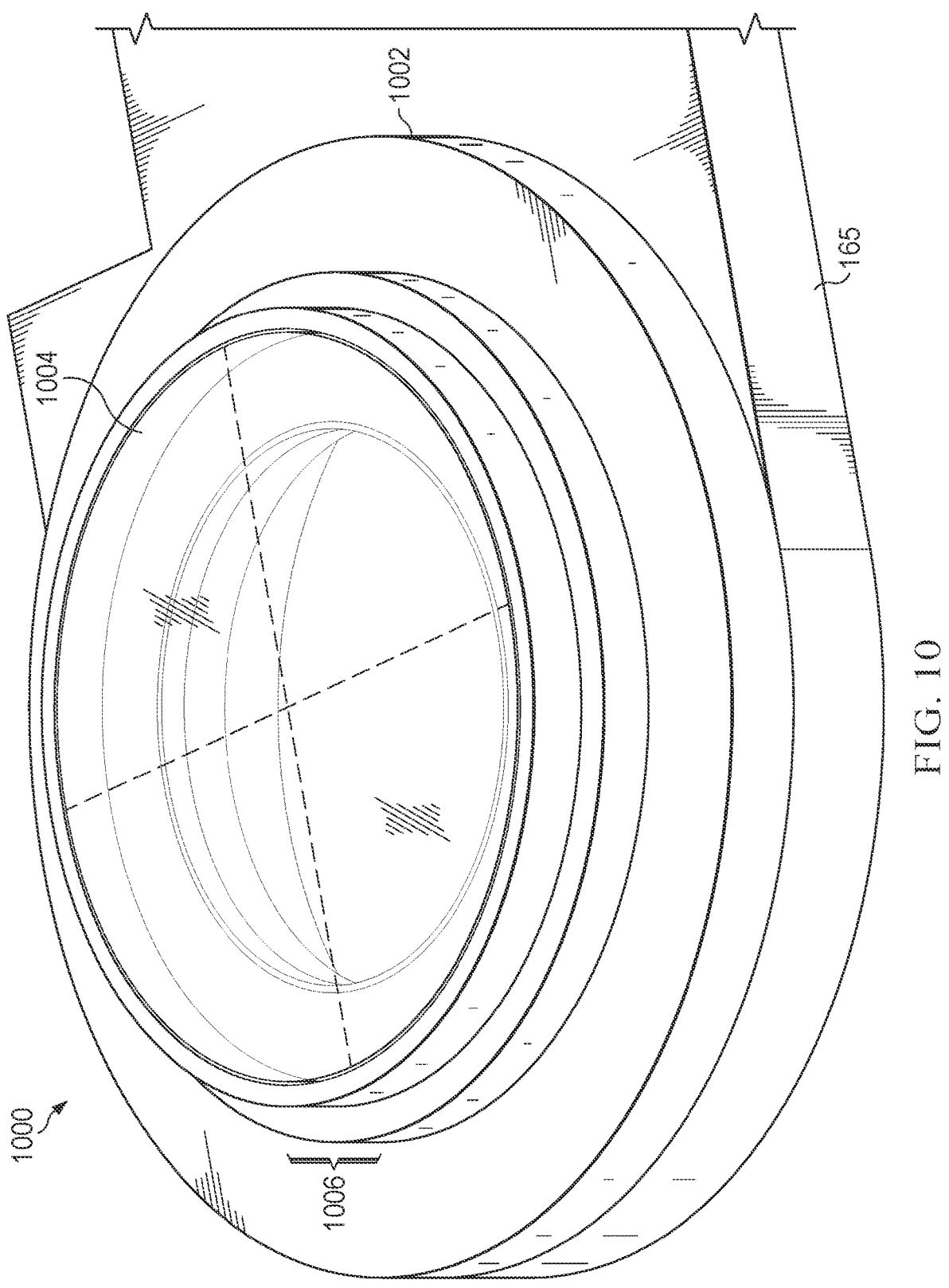
FIG. 10 is a perspective view of an alternative example implementation of the lens cover system of FIG. 1.

FIG. 10 is a perspective view of an example flat lens implementation of the lens cover system 110 of FIG. 1. The example lens cover system 1000 of FIG. 10 includes the example housing 165 of FIG. 1. The lens cover system 1000 further includes an example bracket 1002, an example lens 1004, and an example Z bracket 1006. The lens 1004 corresponds to the lens 145 of FIG. 1. In some examples, although the lens cover system 1000 of FIG. 10 does not include a lens cover, the lens 1004 of FIG. 10 could be replaced with the lens cover 155 of FIG. 1, with the lens 145 being within the housing 165 and the bracket 1002 beneath the lens cover 155. In some examples, the lens 1004, the bracket 1002, and the transducer 150 correspond to the lens cover 155 of FIG. 1. Although the example lens cover system 1000 is illustrated with particular shapes and dimensions, the shape or dimensions of one or more components of the lens cover system 1000 may be different.

The example bracket 1002 of FIG. 10 is a lateral bracket that has an opening (e.g., a circular opening) to house the lens 1004 and extends radially to interface directly with the housing 165. In some examples, the housing 165 is or includes a lens barrel to interface with the bracket 1002. In some examples the bracket 1002 can be connected to the housing 165 using a cap that can be tightened to hold the bracket 1002 firmly in place without concern of tightness level. For example, the bracket 1002 can be connected to the housing 165 using one or more screws, bolts, clamp, adhesive, or any other technique for connecting components. In some examples, the bracket 1002 can be integrated directly into the housing 165. In such examples, the bracket 1002 and the housing 165 are incorporated into one component. As further described below, adhesive is used to provide a watertight seal between the bracket 1002 and the lens 1004. The bracket 1002 includes a circular base to interface with the housing 165 and a circular holding portion that houses the lens 1004. However, if the lens is a different shape, the holding portion that houses the lens 1004 will also be different to properly hold the lens 1004. Also, the circular base on the bracket 1002 may be a different shape.

The bracket 1002 of FIG. 10 includes the Z-bracket 1006, which increases the distance of the lens 1004 from the photo diode 175 housed inside the housing 165. The design of the Z-bracket 1006 increases the acceleration level of the lens, thereby allowing the transducer 150 to operate with less power by leveraging the increase in acceleration level. A graphical representation of the acceleration levels is described below in conjunction with FIG. 12. Also, the example lens 1004 of FIG. 10 is a disk-shaped lens (e.g., flat and circular). However, the lens may correspond to a different shape.

Figure 11:
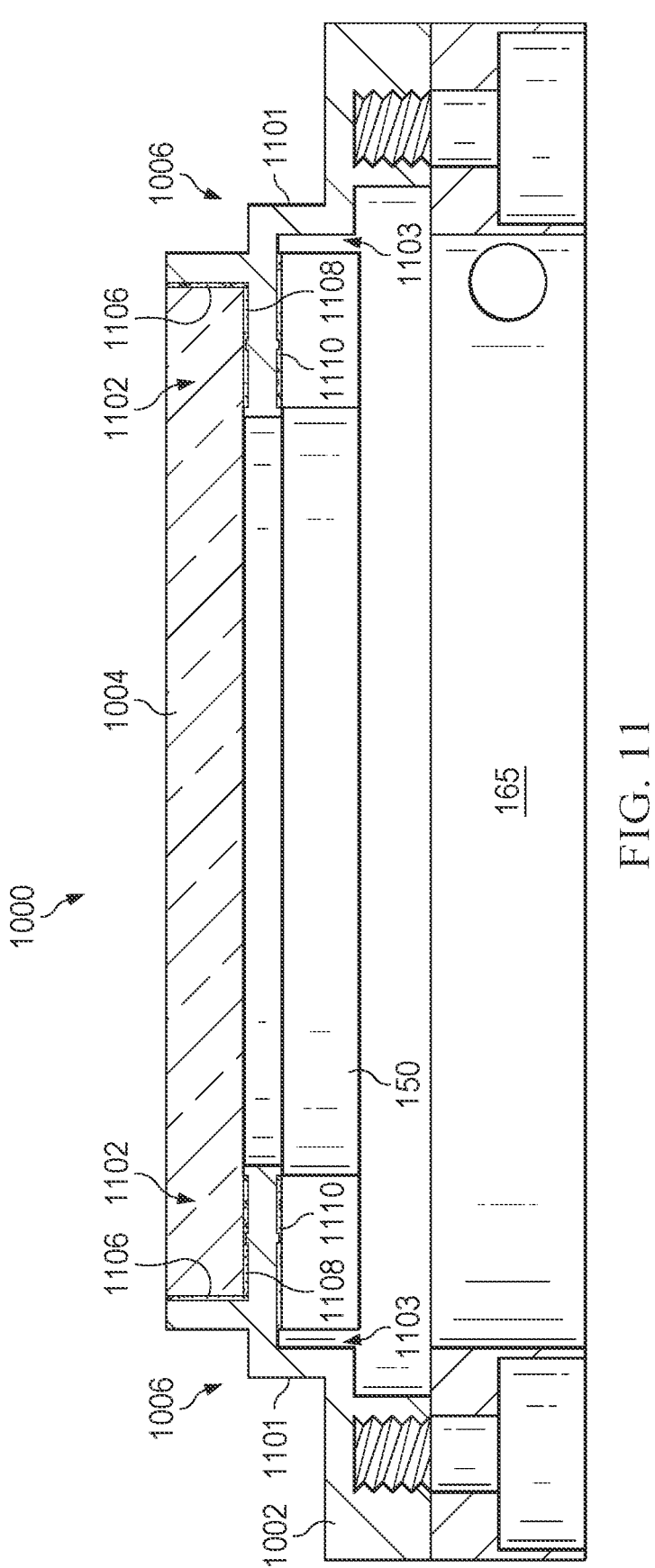
FIG. 11 is a cross-sectional view of the example implementation of the lens cover system of FIG. 10.

FIG. 11 is a cross sectional view of the lens cover system 1000 of FIG. 10. The example lens cover system 1000 of FIG. 11 includes the transducer 150 and the example housing 165 of FIGS. 1, 2, 3, 6, 7, and 10. The lens cover system 1000 of FIG. 11 further includes the example bracket 1002, which includes the example Z-bracket portion 1006, and the example lens 1004 of FIG. 10. The example lens cover system 1000 of FIG. 11 further includes an example step region 1101, an example L-shaped region 1102, an example empty space or vacuum 1103, and example adhesive layers 1106, 1108, 1110. Although the example lens cover system 1000 of FIG. 11 is illustrated with particular shapes and dimensions, the shape or dimensions of one or more components of the lens cover system 1000 may be different. Also, although FIG. 11 illustrates the bracket 1002 coupled to the housing 165 using screws to position the bracket 1002 and the transducer 150 with respect to the lens 1004 and the photo diode 175 of FIG. 1, the bracket 1002 may be coupled to the housing 165 using any type of coupling component. The lens covering system 1000 of FIG. 11 is structured to align the lens 1004, the opening of the bracket 1006, and the opening of the transducer 150 to provide a path from the lens 1004 to the photo diode 175 of FIG. 1.

The transducer 150 of FIG. 11 is a ring or cylindrical transducer that extends radially along the lower support of the L-shaped portion 1102 of the bracket 1002 (e.g., with respect to the orientation of FIG. 11) and includes an opening (e.g., a circular opening) through the center of the ring. The opening provides an optical path from the lens 1004 to the photo diode 175 of FIG. 1. The transducer 150 vibrates radially if activated by an excitation signal from the driver circuitry 105 of FIG. 1. As the transducer 150 vibrates radially, the transducer 150 pivots about its cross-sectional center, which causes the lens 1004 and the bracket 1002 to vibrate up and down with respect to the orientation shown in FIG. 11. Also, as the transducer 150 vibrates, the diameter of the transducer 150 can change (e.g., the transducer 150 gets bigger or smaller). Thus, the bracket 1002 includes the empty space or vacuum 1103 to provide space for the transducer 150 to vibrate freely. In this manner, the transducer 150 will not contact the interior sides of the bracket 1002 during vibration. The transducer 150 is connected to the opposite side of the lower support of the L-side region 1102 using the example adhesive layer 1110. A surface of the transducer 150 is connected to the opposite surface of the lower support of the L-shaped portion 1102 using the example adhesive layer 1110. In this manner, if the transducer 150 vibrates, the bracket 1002 and the lens 1004 also vibrate as they are coupled to each other via the adhesive layers 1106, 1108, 1110.

As shown in FIG. 11, the bracket 1002 includes the example Z bracket 1006. The Z bracket 1006 includes the example step-shaped portion 1101 and the example L-shaped region 1102. The step-shaped portion 1101 increases the distance from the transducer 150 and the lens 1004 to the photo diode 175. The step-shaped portion 1101 extends radially based on the shape of the transducer 150 and the space needed for the empty space or vacuum 1103. The L-shaped region 1102 includes a lower support and a side support for the lens 1004 and extends radially based on the shape of the lens 1004. In this manner, the lens can be housed within the L-shaped portion 1102 of the bracket 1002. To prevent the lens from falling out of the bracket 1002 and to provide a watertight seal, the adhesive layers 1106, 1108 are located between the lens 1004 and the side and lower supports of the L-shaped portion 1102. For example, a surface of the lens 1004 is connected to a surface of the L-shaped portion 1102 of the bracket 1006 via adhesive layer 1106.

Also, a surface of the L-shaped portion 1102 of the bracket 1006 is connected to a surface of the lens 1004 via the adhesive layer 1108. The adhesive layers 1106, 1108 is applied throughout the radial L-shaped portion 1102 to provide a 360-degree watertight seal between the radial L-shaped portion 1102 and the lens 1004. The adhesive layers 1106, 1108, 1110 is or includes an adhesive material, such as glue, epoxy, or any other adhesive material. The adhesive layers 1106, 1108, 1110 are strong enough to withstand the sheer stress associated with the vibration, as further described below in conjunction with FIGS. 13A-13C.

Figure 12:
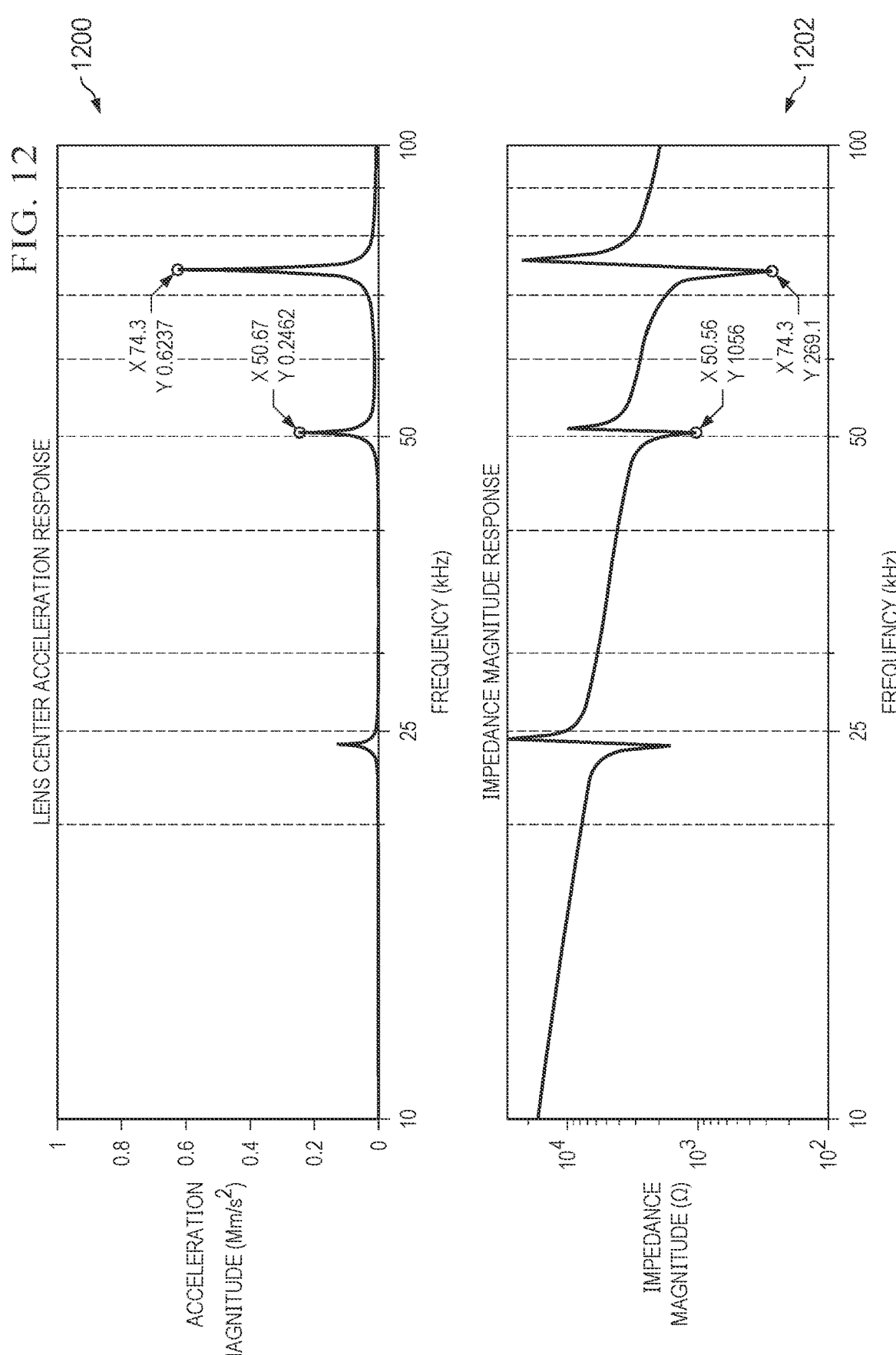
FIG. 12 illustrates example frequency response diagrams corresponding to the lens cover system of FIGS. 10 and 11.

FIG. 12 illustrates an example acceleration response 1200 at the center of the lens 1004 of FIGS. 10-11 and an example impedance magnitude response 1202 for the lens cover system 1000. The responses 1200, 1202 are based on at least one of the characteristics of the lens 1004 or external characteristics.

As shown in FIG. 12, the magnitude of the impedance corresponds to the magnitude of the acceleration. For example, as the impedance magnitude response 1202 decreases, the acceleration magnitude response 1200 increases. At the 50.67 KHz frequency of the excitation signal, the magnitude of the impedance decreases to about 1056 Ohms. The decrease in impedance causes the acceleration magnitude to increase to 0.2462 Mm/s². Because 0.2462 Mm/s² is sufficient for expelling water from the lens 1004, an excitation signal at 50.67 kHz causes the transducer 150 to vibrate and expel liquid from the lens 1004. Also, at the 74.3 kHz frequency of the excitation signal, the magnitude of the impedance decreases to about 269.1 Ohms. The decrease in impedance causes the acceleration magnitude to increase to 0.6237 Mm/s². Because 0.6237 Mm/s² is sufficient for expelling water from the lens 1004, an excitation signal at 74.3 kHz causes the transducer 150 to vibrate and expel liquid from the lens 1004. As described above, although either frequency can be used to excite the transducer 150, both frequencies may result in different mode shapes and corresponding nodal points at different locations outside of the center of the lens. Accordingly, the driver circuitry 105 may alternate the excitation signal between the two frequencies to avoid nodal points on the lens 1004.

Figure 13A:
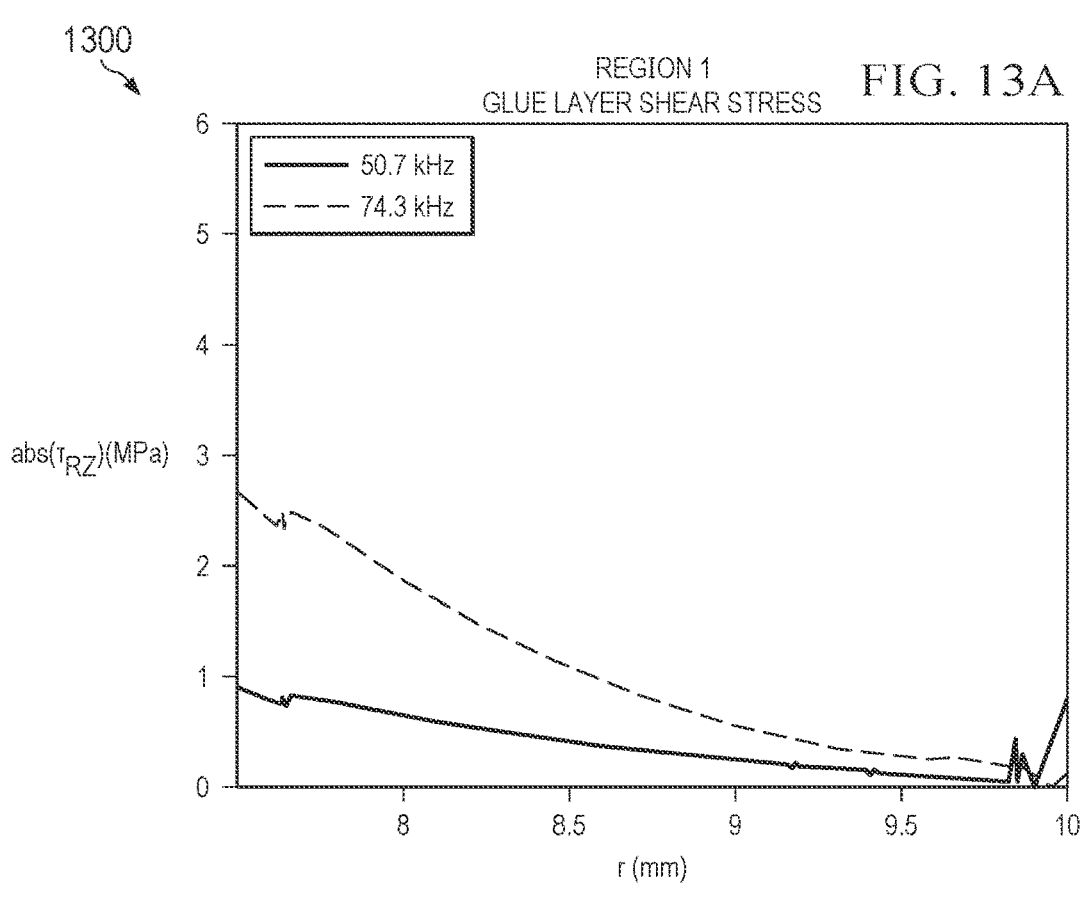
FIGS. 13A-13C illustrate stress plots corresponding to the lens cover system of FIGS. 10 and 11.
Figure 13B:
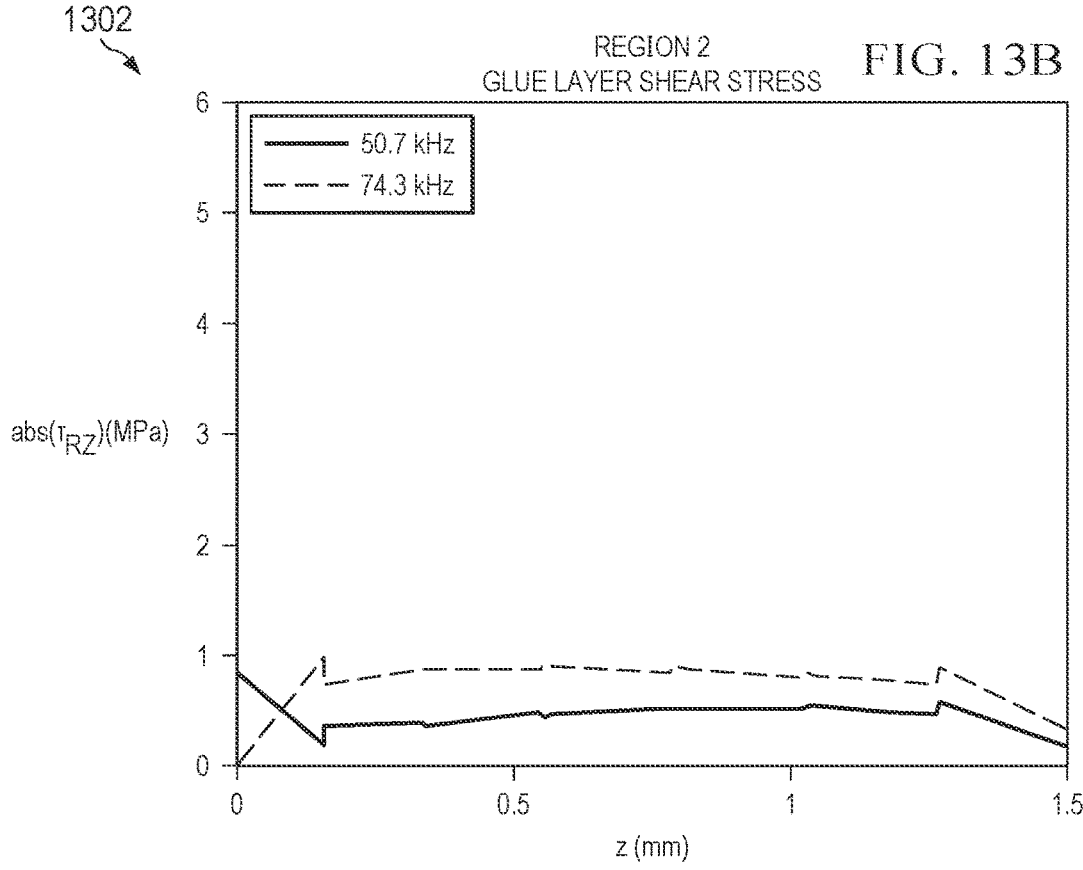
Figure 13C:
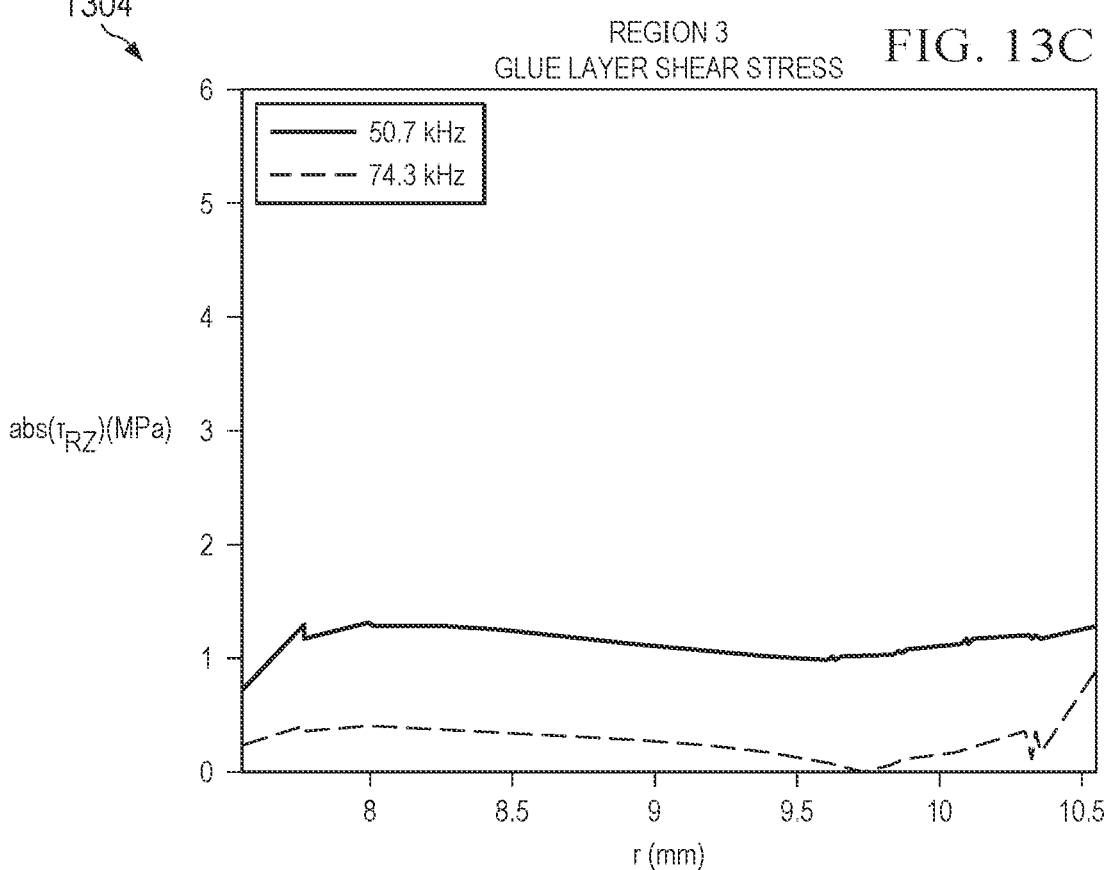

FIGS. 13A-13C illustrate the adhesive shear stress levels for the adhesive layers 1106, 1108, 1110 of FIG. 11. A first example plot 1300 corresponds to the adhesive sheer stress level of the adhesive layer 1108. A second example plot 1302 corresponds to the adhesive sheer stress level of the adhesive layer 1106. A third example plot 1304 corresponds to the adhesive sheer stress level of the adhesive layer 1110.

The lap shear stress of the adhesive layer is the amount of stress that will cause the adhesive to no longer adhere two components. The lap shear stress of the adhesive layer may be based on characteristics of the adhesive and environmental characteristics. For example, the type, age, amount etc., of glue, epoxy, etc., and the environmental temperature, humidity, etc., may factor into the lap shear stress of the adhesive layer. In general, the threshold amount of sheer stress that is acceptable may be any sheer stress below 7.6 MPa which the lap sheet stress being closer to about 13.8 MPa. The plots 1300, 1302, 1304 illustrate the adhesive layer sheer stresses throughout the respective layers at the two excitation frequencies identified in FIG. 12 (e.g., 50.7 kHz and 74.3 kHz). As shown in the plots 1300, 1302, 1304, none of the sheer stress levels exceed 3 MPa at any point across the adhesive layers 1106, 1108, 1110. Thus, there is minimal risk in a lap shear event using the adhesive layers 1106, 1108, 1110 of FIG. 11.

Figure 14:
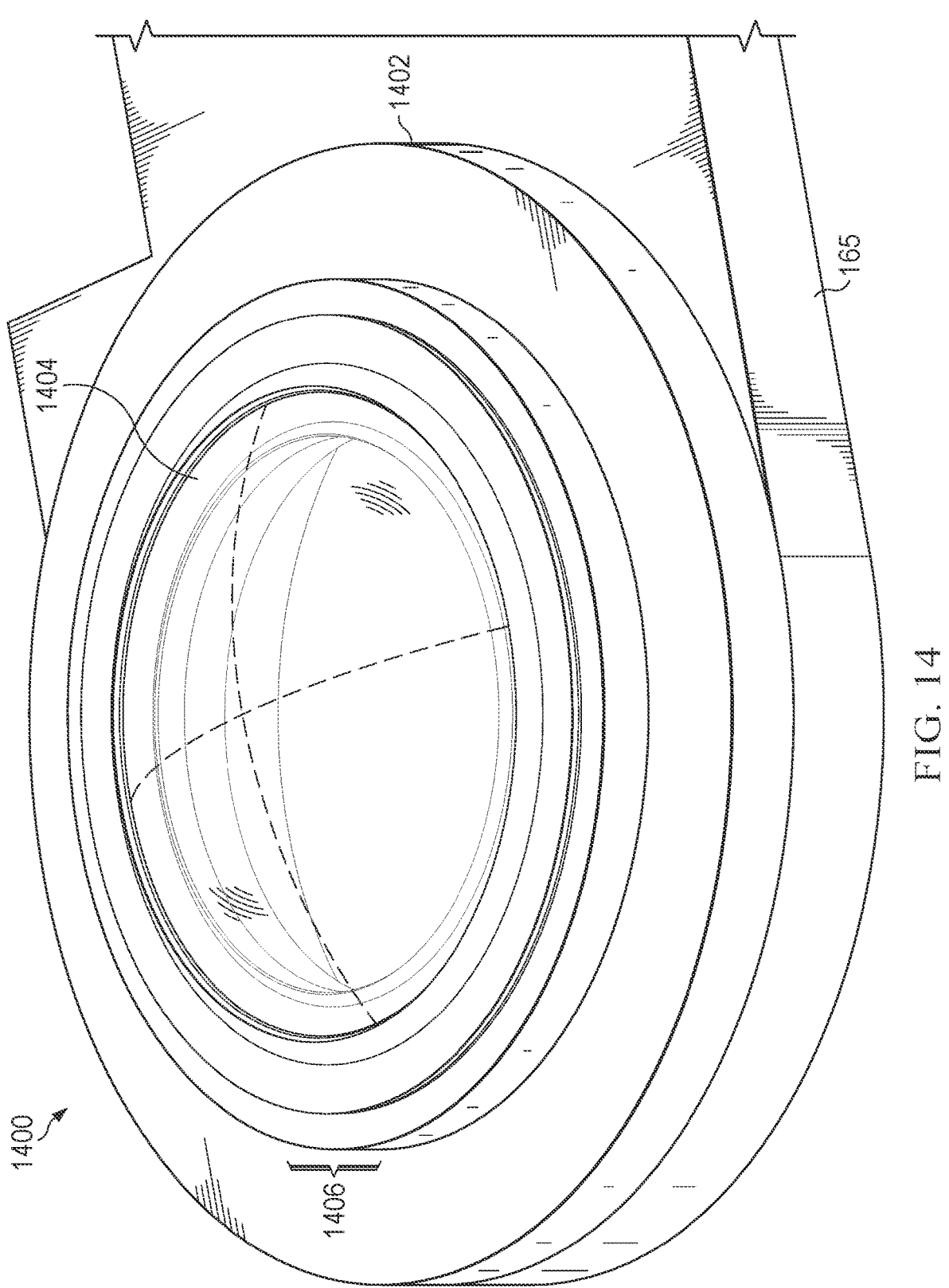
FIG. 14 is a perspective view of an alternative example implementation of the lens cover system of FIG. 1.

FIG. 14 is a perspective view of an example curved lens implementation of the lens cover system 110 of FIG. 1. The example lens cover system 1400 of FIG. 14 includes the example housing 165 of FIG. 1. The lens cover system 1400 further includes an example bracket 1402, an example lens 1404, and an example Z-shaped bracket 1406. The lens 1404 corresponds to the lens 145 of FIG. 1. In some examples, although the lens cover system 1400 of FIG. 14 does not include a lens cover, the lens 1404 of FIG. 14 could be replaced with the lens cover 155 of FIG. 1, with the lens 145 being within the housing 165 and the bracket 1402 beneath the lens cover 155. In some examples, the lens 1404, the bracket 1402, and the transducer 150 correspond to the lens cover 155 of FIG. 1. Although the example lens cover system 1400 is illustrated with particular shapes and dimensions, the shape or dimensions of one or more components of the lens cover system 1400 may be different.

The example bracket 1402 of FIG. 14 is a lateral bracket that has an opening (e.g., a circular opening) to house the lens 1404 and extends radially to interface directly with the housing 165. In some examples, the housing 165 is or includes a lens barrel to interface with the bracket 1402. In some examples the bracket 1402 can be connected to the housing 165 using a cap that can be tightened to hold the bracket 1402 firmly in place without concern of tightness level. For example, the bracket 1402 can be connected to the housing 165 using one or more screws, bolts, clamps, adhesive, or any other technique for connecting components. In some examples, the bracket 1402 can be integrated directly into the housing 165. In such examples, the bracket 1402 and the housing 165 are incorporated into one component. As further described below, adhesive is used to provide a watertight seal between the bracket 1402 and the lens 1404. The bracket 1402 includes a circular base to interface with the housing 165 and a circular holding portion that houses the lens 1404. However, if the lens is a different shape, the holding portion that houses the lens 1404 will also be different to be able to properly hold the lens 1404. Also, the circular base on the bracket 1402 may be a different shape.

The bracket 1402 of FIG. 10 includes the Z shaped bracket 1406, which increases the distance of the lens 1404 from the photo diode 175 housed inside the housing 165. The design of the Z shaped bracket 1406 increases the acceleration level of the lens, thereby allowing the transducer 150 to operate with less power by leveraging the increase in acceleration level. A graphical representation of the acceleration levels is described below in conjunction with FIG. 16. Also, the example lens 1404 of FIG. 14 is a disk-shaped lens (e.g., flat and circular). However, the lens may correspond to a different shape.

Figure 15A:
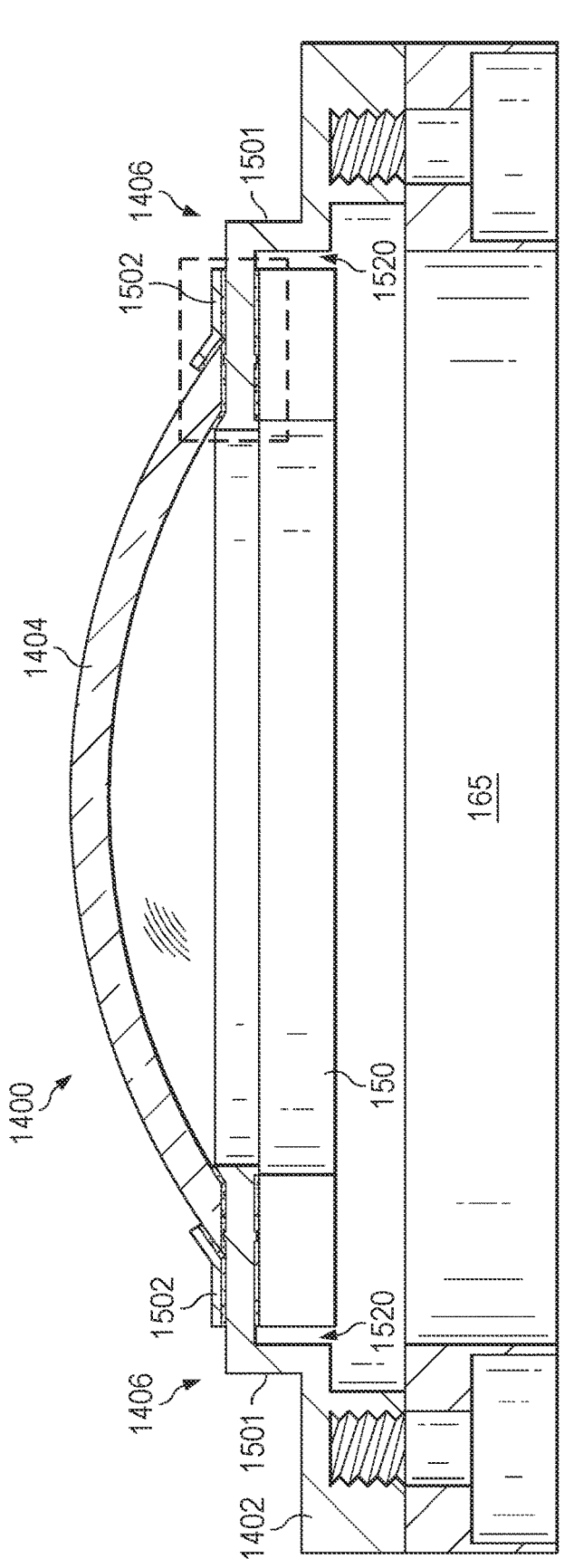
FIGS. 15A and 15B illustrate a cross-sectional view of the example implementation of the lens cover system of FIG. 14.
Figure 15B:
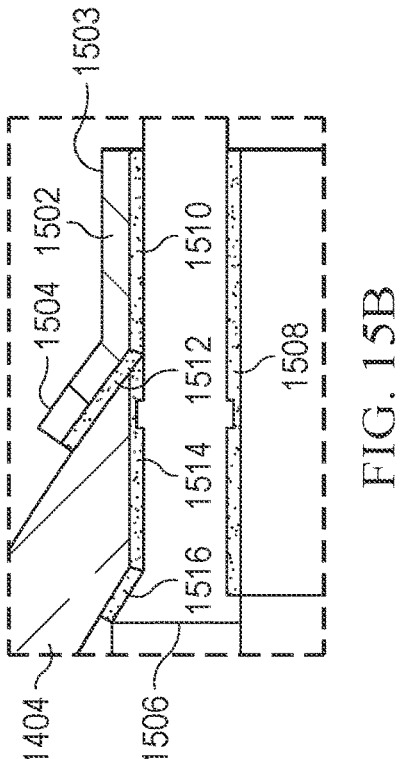

FIGS. 15A-15B is a cross sectional view of the lens cover system 1400 of FIG. 14. The example lens cover system 1400 of FIGS. 15A-15B includes the transducer 150 and the example housing 165 of FIGS. 1, 2, 3 and 14. The lens cover system 1400 of FIGS. 15A-15B further includes the example bracket 1402, the example lens 1404, and the Z shaped bracket 1406 of FIG. 14, which includes an example step portion 1501 and an example ring-shaped portion 1502. The example lens cover system 1400 of FIGS. 15A-15B further includes an example ring-shaped plate 1503 (also referred to as a ring plate), example transition surfaces 1504, 1506, example adhesive layers 1508, 1510, 1512, 1514, 1516, and an example empty space or vacuum 1520. Although the example lens cover system 1400 of FIGS. 15A-15B is illustrated with particular shapes and dimensions, the shape or dimensions of one or more components of the lens cover system 1400 may be different. Also, although FIGS. 15A-15B illustrates the bracket 1402 coupled to the housing 165 using screws to position the bracket 1402 and the transducer 150 with respect to the lens 1404 and the photo diode 175 of FIG. 1, the bracket 1402 may be coupled to the housing 165 using any type of coupling component. The lens covering system 1400 of FIGS. 15A-15B is structured to align the lens 1404, the opening of the bracket 1402, the opening of the ring bracket 1406, and the opening of the transducer 150 to provide a path from the lens 1404 to the photo diode 175 of FIG. 1.

The transducer 150 of FIGS. 15A-15B is a ring or cylindrical transducer that extends radially along the lower support of the step portion 1501 of the bracket 1402 (e.g., with respect to the orientation of FIGS. 15A-15B) and includes an opening (e.g., a circular opening) through the center of the ring. The opening provides an optical path from the lens 1404 to the photo diode 175 of FIG. 1. The transducer 150 vibrates radially if activated by an excitation signal from the driver circuitry 105 of FIG. 1. As the transducer 150 vibrates radially, the transducer 150 pivots about its cross-sectional center, which causes the lens 1404 and the bracket 1402 to vibrate up and down with respect to the orientation shown in FIGS. 15A-15B. Also, as the transducer 150 vibrates, the diameter of the transducer 150 can change (e.g., the transducer 150) gets bigger or smaller). Thus, the bracket 1402 includes the empty space or vacuum 1520 to provide space for the transducer 150 to vibrate freely. In this manner, the transducer 150 will not contact the interior sides of the bracket 1402 during vibration. A surface of the transducer 150 is connected to a surface on the opposite side of the lower support of the step portion 1501 (with respect to the orientation of FIGS. 15A-15B) using the example adhesive layer 1508. A surface of the transducer 150 is connected to the opposite surface of the lower support of the step portion 1501 of the bracket 1402 using the example adhesive layer 1508. In this manner, if the transducer 150 vibrates, the bracket 1402 and the lens 1404 also vibrate as they are coupled to each other via the adhesive layers 1508, 1510, 1512, 1514, 1516.

As shown in FIGS. 15A-15B, the Z-shaped bracket 1402 includes the step shaped portion 1501. The step shaped portion 1501 increases the distance from the transducer 150 and the lens 1404 to the photo diode 175. The step shaped portion 1501 extends radially based on the shape of the transducer 150 and the space needed for the empty space or vacuums 1520. A surface on the ring bracket 1502 is connected to the top surface of the step shaped portion 1501 (e.g., based on the orientation of FIGS. 15A-15B) using the adhesive layer 1510. The ring bracket 1502 includes the ringed plate 1503 and the transition surface 1504.

The ring bracket 1502 extends radially around the lateral bracket 1402 and has an opening (e.g., a circular opening) to house the lens 1404. Accordingly, the ring plate 1503 and transition surface 1504 extend radially around the lateral bracket 1402. The ring plate 1503 is a flat plate that is coupled to the step portion 1501 of the bracket 1402 using the adhesive layer 1510. The ring plate 1503 extends into the transition surface 1504. The transition surface 1504 is also referred to as a conical plate, a conical surface, a lipped surface, or lipped plate. The transition surface 1504 is an angled surface that corresponds to the angle of the curved lens 1404 with respect to the lateral bracket 1402. In this manner, the bottom surface (e.g., with respect to the orientation of FIGS. 15A-15B) of the transition surface 1504 is coupled to a surface of the lens 1404 using the adhesive layer 1512. The adhesive layers 1510, 1512 secure the lens and provide a watertight seal. For example, the adhesive layers 1510, 1512 are applied throughout the ring bracket 1502 to provide a 360 degree watertight seal between the ring bracket 1502 and the lens 1404. The adhesive layers 1510, 1512 are or includes an adhesive material, such as glue, epoxy, or any other adhesive material. The adhesive layers 1510, 1512 are strong enough to withstand the sheer stress associated with the vibration, as further described below in conjunction with FIGS. 17A-17E.

In the example of FIGS. 15A-15B, a surface of the lens 1404 is coupled with a surface on the step portion 1501 of the bracket 1402 using the adhesive layer 1514. To further secure the lens 1404 to the bracket 1402, the step portion 1501 of the lateral bracket 1402 includes a transition surface 1506 that is an angled surface that corresponds to the angle of the curved lens 1404 with respect to the lateral bracket 1402. The top surface (e.g., with respect to the orientation of FIGS. 15A-15B) of the transition surface 1506 is coupled to a surface of the lens 1404 using the adhesive layer 1516. The adhesive layers 1514, 1516 secure the lens and provide a watertight seal. For example, the adhesive layers 1514, 1516 are applied throughout the ring bracket 1502 to provide a 360-degree watertight seal between the ring bracket 1502 and the lens 1404. The adhesive layers 1514, 1516 are or includes an adhesive material, such as glue, epoxy, or any other adhesive material. The adhesive layers 1514, 1516 are strong enough to withstand the sheer stress associated with the vibration, as further described below in conjunction with FIGS. 17A-17E.

The lens cover system 1400 of FIGS. 15A-15B provides a first watertight seal via the adhesive layers 1514, 1516 and a second watertight seal via the ring bracket 1502 and the adhesive layers 1510, 1512. However, in some examples, the ring bracket 1502 and the adhesive layers 1510, 1512 can be removed. For example, the ring bracket 1502 and adhesive layers 1510, 1512 lower the sheet stress throughout the lens cover system 1400 during vibration of the transducer 150. Accordingly, if the adhesive layers 1514, 1516 are strong enough to secure the lens 1404 to the lateral bracket 1402 during vibration of the transducer 150, the ring bracket 1502 can be removed. For example, if the transducer 150 operates at a lower frequency, it may be possible to secure the lens 1404 to the bracket 1402 without the ring bracket 1502. However, if the transducer 150 operates at a high frequency, the ring bracket 1502 may be utilized to provide additional strength to avoid the lens 1404 from breaking free from the adhesive layers 1514, 1516 during vibration. Also, the adhesive layers 1514, 1516 need to provide a sufficient watertight seal to implement the lens cover system 1400 without the ring bracket 1502. Alternatively, the adhesive layers 1508, 1514 may be removed if the adhesive layers 1512, 1510 provide enough sheer strength and a sufficient seal.

Figure 16:
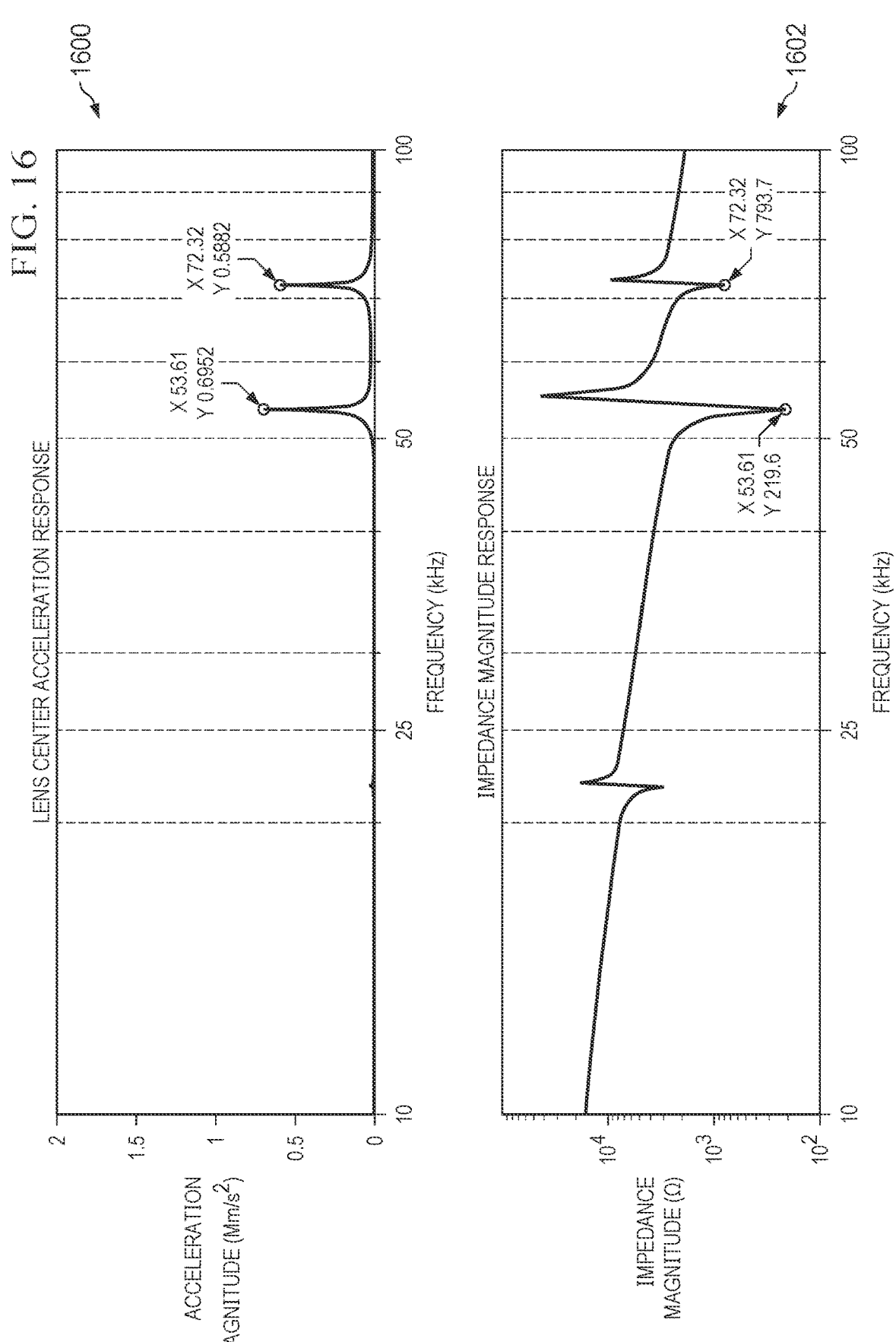
FIG. 16 illustrates example frequency response diagrams corresponding to the lens cover system of FIGS. 14 and 15A-15B.
Figure 17A:
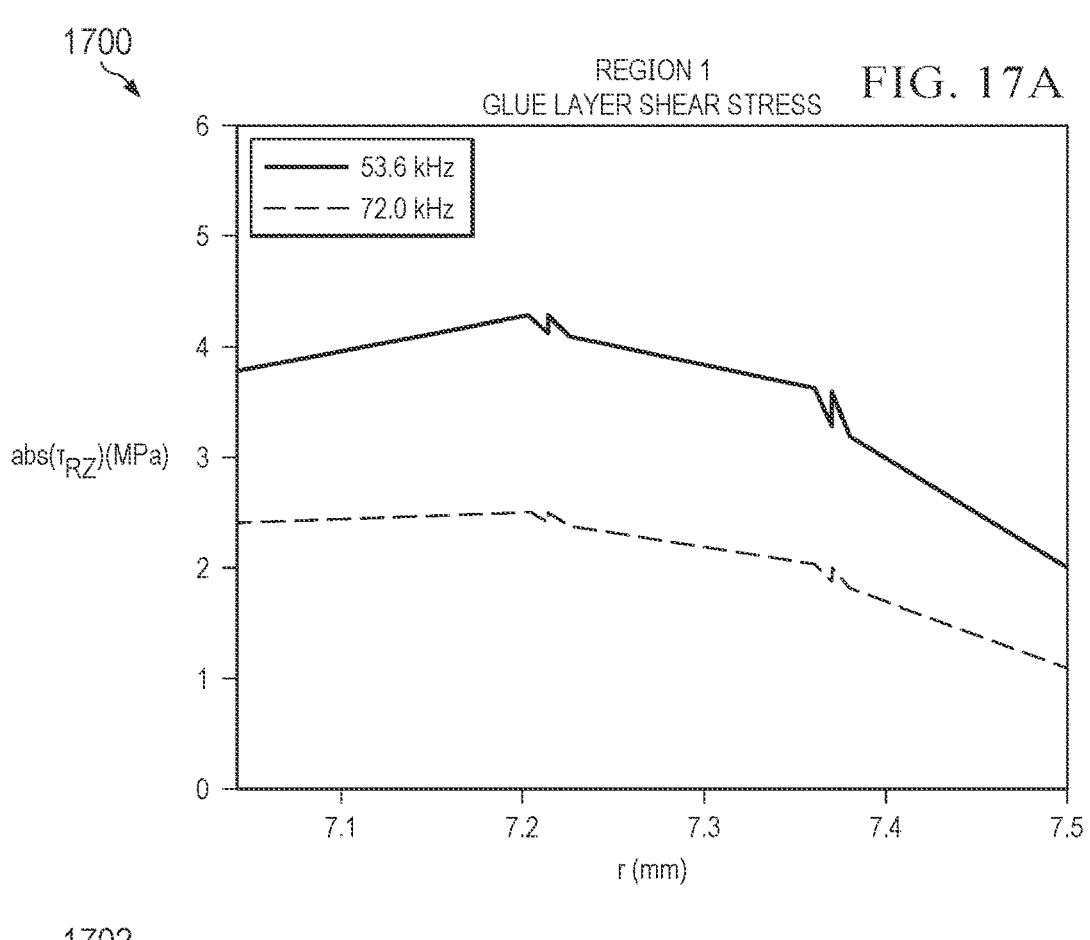
FIGS. 17A-17E illustrate stress plots corresponding to the lens cover system of FIGS. 14 and 15A-15B.
Figure 17B:
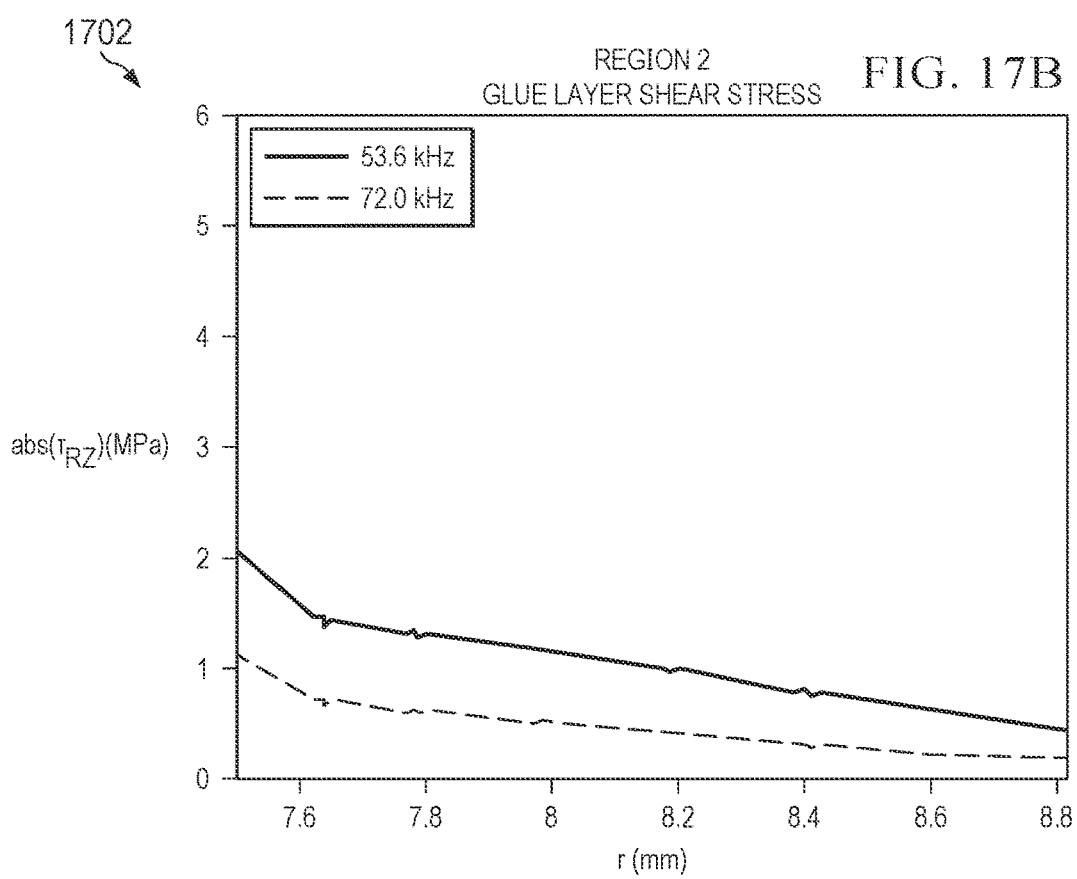
Figure 17C:
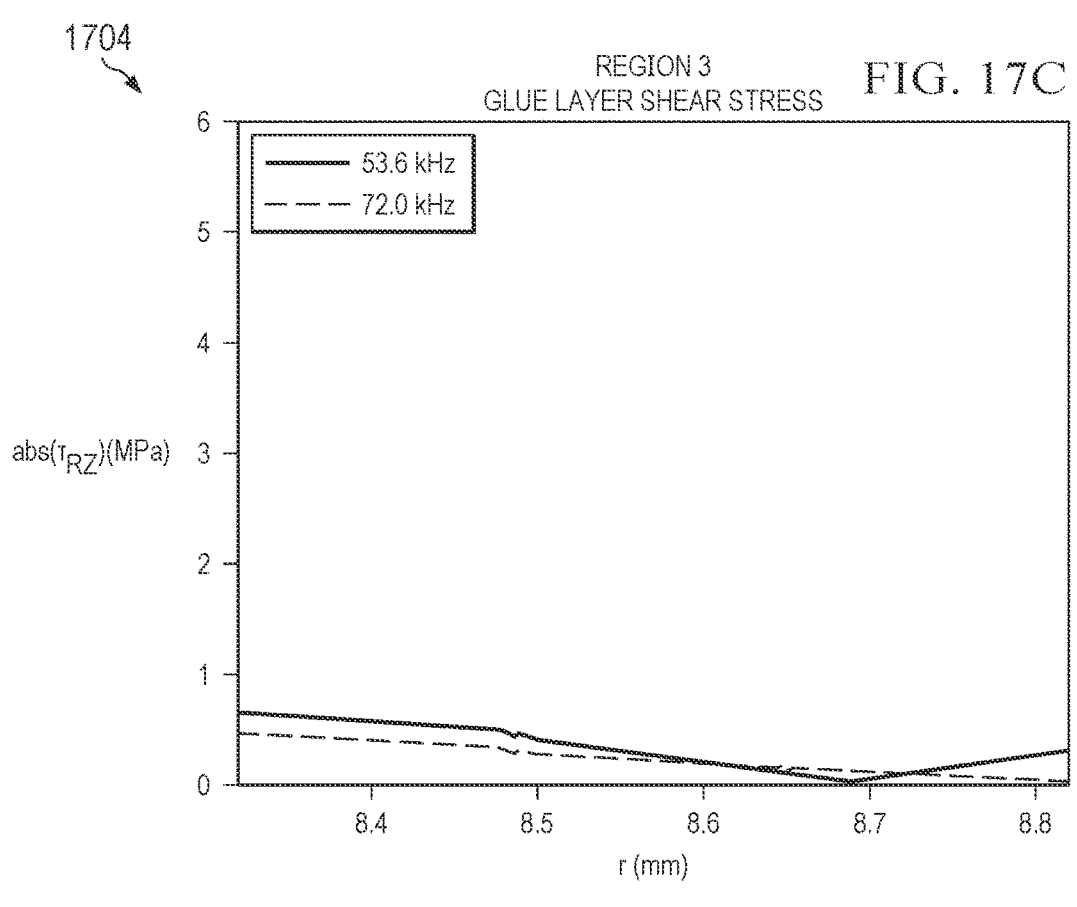
Figure 17D:
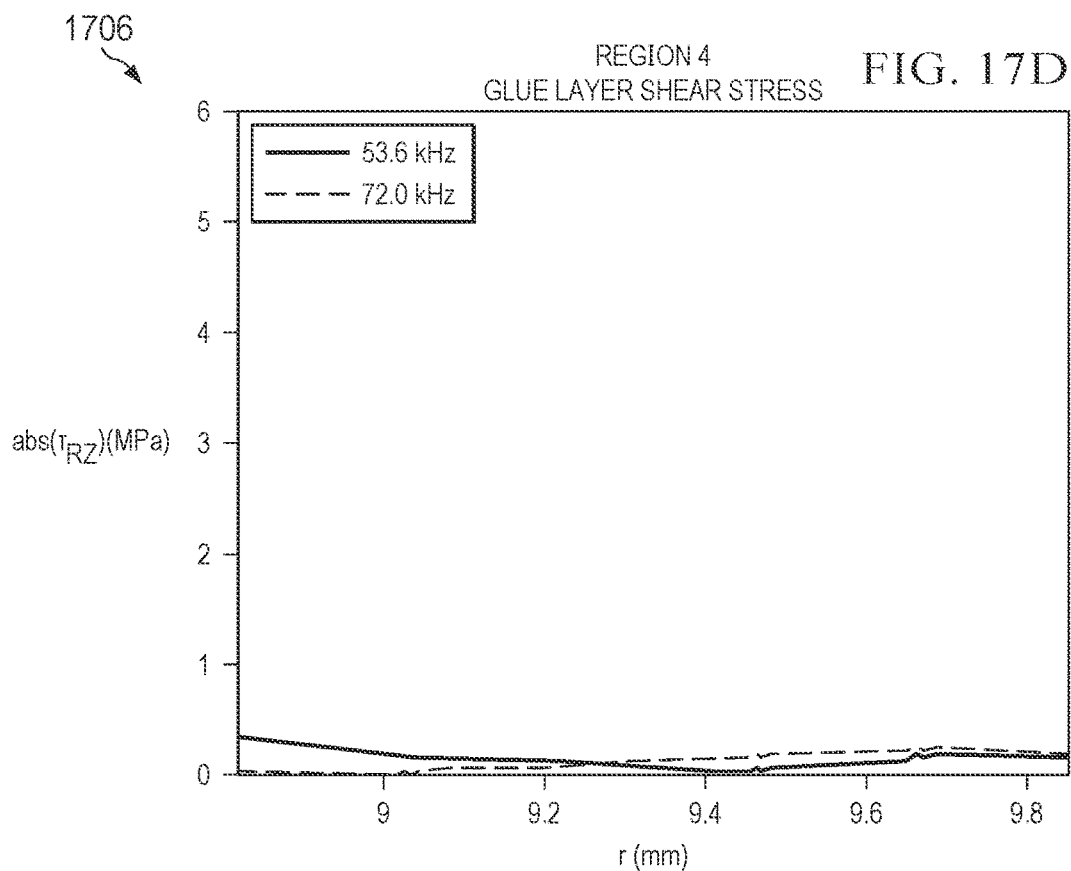
Figure 17E:
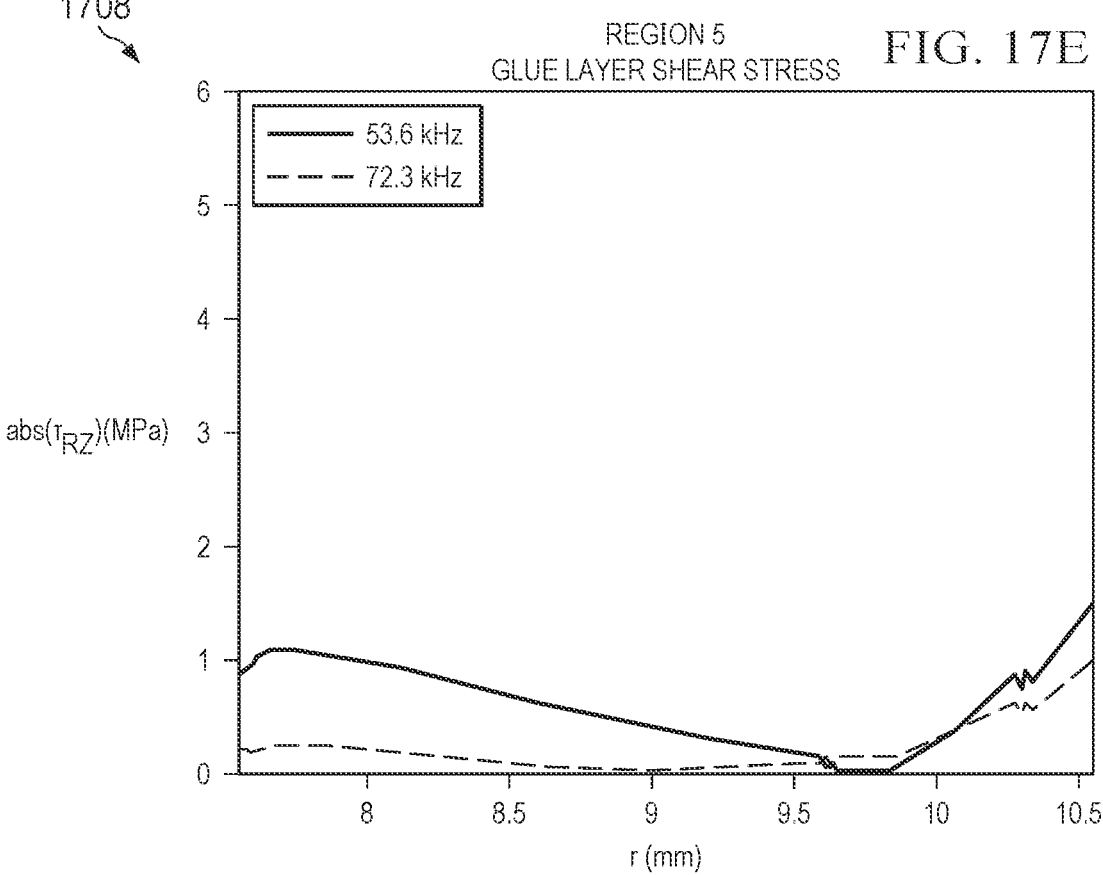

FIG. 16 illustrates an example acceleration response 1600 at the center of the lens 1404 of FIGS. 14-15 and an example impedance magnitude response 1602 for the lens cover system 1400. The responses 1600, 1602 are based on at least one of the characteristics of the lens 1404 or external characteristics.

As shown in FIG. 16, the magnitude of the impedance corresponds to the magnitude of the acceleration. For example, as the impedance magnitude response 1602 decreases, the acceleration magnitude response 1600 increases. At the 53.61 KHz frequency of the excitation signal, the magnitude of the impedance decreases to about 219.6 Ohms. The decrease in impedance causes the acceleration magnitude to increase to 0.6952 Mm/s$^2$. Because 0.6952 Mm/s$^2$ is sufficient for expelling water from the lens 1404, an excitation signal at 53.61 kHz causes the transducer 150 to vibrate and expel liquid from the lens 1404. Also, at the 72.32 KHz frequency of the excitation signal, the magnitude of the impedance decreases to about 793.7 Ohms. The decrease in impedance causes the acceleration magnitude to increase to 0.5882 Mm/s$^2$. Because 0.5882 Mm/s$^2$ is sufficient for expelling water from the lens 1404, an excitation signal at 72.32 kHz causes the transducer 150 to vibrate and expel liquid from the lens 1404. As described above, although either frequency can be used to excite the transducer 150, both frequencies may result in different mode shapes and corresponding nodal points at different locations outside of the center of the lens. Accordingly, the driver circuitry 105 may alternate the excitation signal between the two frequencies to avoid nodal points on the lens 1404.

FIGS. 17A-17E illustrate the adhesive shear stress levels for the adhesive layers 1508, 1510, 1512, 1514, and 1516 of FIGS. 15A-15B. A first example plot 1700 corresponds to the adhesive sheer stress level of the adhesive layer 1516. A second example plot 1702 corresponds to the adhesive sheer stress level of the adhesive layer 1514. A third example plot 1704 corresponds to the adhesive sheer stress level of the adhesive layer 1512. A fourth example plot 1706 corresponds to the adhesive sheer stress level of the adhesive layer 1510. A fifth example plot 1708 corresponds to the adhesive sheer stress level of the adhesive layer 1508.

The lap shear stress of the adhesive layer is the amount of stress that will cause the adhesive to no longer adhere two components. The lap shear stress of the adhesive layer may be based on characteristics of the adhesive and environmental characteristics. For example, the type, age, amount etc., of glue, epoxy, etc., and the environmental temperature, humidity, etc., may factor into the lap shear stress of the adhesive layer. In general, the threshold amount of sheer stress that is acceptable may be any sheer stress below 7.6 MPa which the lap sheet stress being closer to about 13.8 MPa. The plots 1700, 1702, 1704, 1706, 1708 illustrate the adhesive layer sheer stresses throughout the respective layers at the two excitation frequencies identified in FIG. 16 (e.g., 53.61 kHz and 72.32 kHz). As shown in the plots 1700, 1702, 1704, 1706, 1708, none of the sheer stress levels exceed 4.4 MPa at any point across the adhesive layers 1508, 1510, 1512, 1514, 1516. Thus, there is minimal risk in a lap shear event using the adhesive layers 1508, 1510, 1512, 1514, 1516 of FIGS. 15A-15B.

Figure 18:
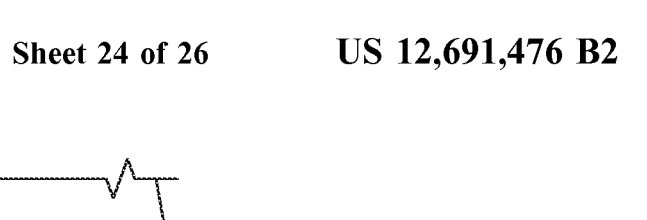
FIG. 18 is a perspective view of an example implementation of the lens cover system of FIG. 1.

FIG. 18 is a perspective view of an example flat lens implementation of the lens cover system 110 of FIG. 1. The lens cover system 1800 includes an example housing 1802, an example housing cap 1803, an example lens 1804, and an example membrane 1806. The example housing 1802 can be used to implement the housing 165 of FIG. 1. The lens 1804 corresponds to the lens 145 of FIG. 1. In some examples, although the lens cover system 1800 of FIG. 18 does not include a lens cover, the lens 1804 of FIG. 18 could be replaced with the lens cover 155 of FIG. 1, with the lens 145 being within the housing 165 and the housing 1802 beneath the lens cover 155 (with respect to the orientation of FIG. 18). In some examples, the lens 1804, the housing 1802, the housing cap 1803, and the transducer 150 correspond to the lens cover 155 of FIG. 1. Although the example lens cover system 1800 is illustrated with particular shapes and dimensions, the shape or dimensions of one or more components of the lens cover system 1800 may be different.

The example housing 1802 of FIG. 18 is a lateral housing having an opening (e.g., a circular opening) to house the lens 1804 and extends radially. The housing 1802 includes an example housing cap 1803 that secures the lens 1804 into the housing 1802. In some examples the housing 1802 can be connected to the housing using adhesive using one or more screws, bolts, clamps, adhesive, or any other technique(s) for connecting components. In some examples, the housing 1802 can be integrated directly into the housing cap 1803. In such examples, the housing 1802 and the housing cap 1803 are incorporated into one component. In some examples, the housing cap 1803 is coupled to the lens 1804 via the membrane 1806 and the adhesive layer. The housing 1802 includes a circular base to interface with the housing 165 and a circular holding portion that houses the lens 1804. However, if the lens is a different shape, the holding portion that houses the lens 1804 will also be different to properly hold the lens 1804. Also, the circular base on the housing 1802 may be a different shape. The example lens 1804 of FIG. 18 is a disk-shaped lens (e.g., flat and circular). However, the lens may correspond to a different shape.

Although the lens cover systems 200, 600, 1000, 1400 of FIGS. 2, 3, 6, 7, 10, 11, 14, and 15 provide a strong and robust structure, the structure of the brackets 202, 602, 1002, 1402 of FIGS. 2, 6, 10, and 14 may dampen the resonant frequency of the lens 1804. Accordingly, more power is used by the transducer 150. The lens cover system 1800 replaces the bracket and with a membrane 1806, which minimizes or reduces the damping impact on the resonant frequency and mode shape of the lens 1804. The structure (e.g., thickness and material) of the membrane 1806 provides enough flexibility to allow the lens 1804 to move without moving the housing 1802 and housing cap 1803, even though the lens is connected to the housing cap 1803 (which is connected to the housing 1802) via the membrane 1806 and the adhesive layer. Accordingly, the transducer can move the lens 1804 with less power than the lens covering systems 110, 200, 600, 1000, 1400 of FIGS. 1, 2, 3, 6, 7, 10, 11, 14, and 15. However, the lens covering system 1800 of FIG. 18 may not be as robust or strong as the lens covering systems 110, 200, 600, 1000, 1400 of FIGS. 1, 2, 3, 6, 7, 10, 11, 14, and 15. The membrane 1806 may be or include one or more of polyamide, aluminum, stainless steel, nylon, plastic, polymers, etc. The membrane 1806 is circular. The membrane 1806 includes an opening that is aligned with the housing cap 1803, and the transducer 150 to provide a path from the lens 1804 to the photo diode 175 of FIG. 1.

The housing cap 1803 of FIG. 18 operates as a watertight seal with the lens cover (e.g., including the lens 1804 and the transducer 150. Also, the housing cap 1803 resists outside hazards. In an example, the housing cap 1803 plays little to no role in the resonant frequency of the system. However, the brackets 202, 602, 1002, 1402 of FIGS. 2, 3, 6, 7, 10, 11, 14, and 15 are part of the lens cover and play a role in the determination of the resonant frequency of the system. The brackets 202, 602, 1002, 1402 of FIGS. 2, 3, 6, 7, 10, 11, 14, and 15 can, like the housing cap 1803, be used to create a watertight seal and resist outside hazards.

Figure 19:
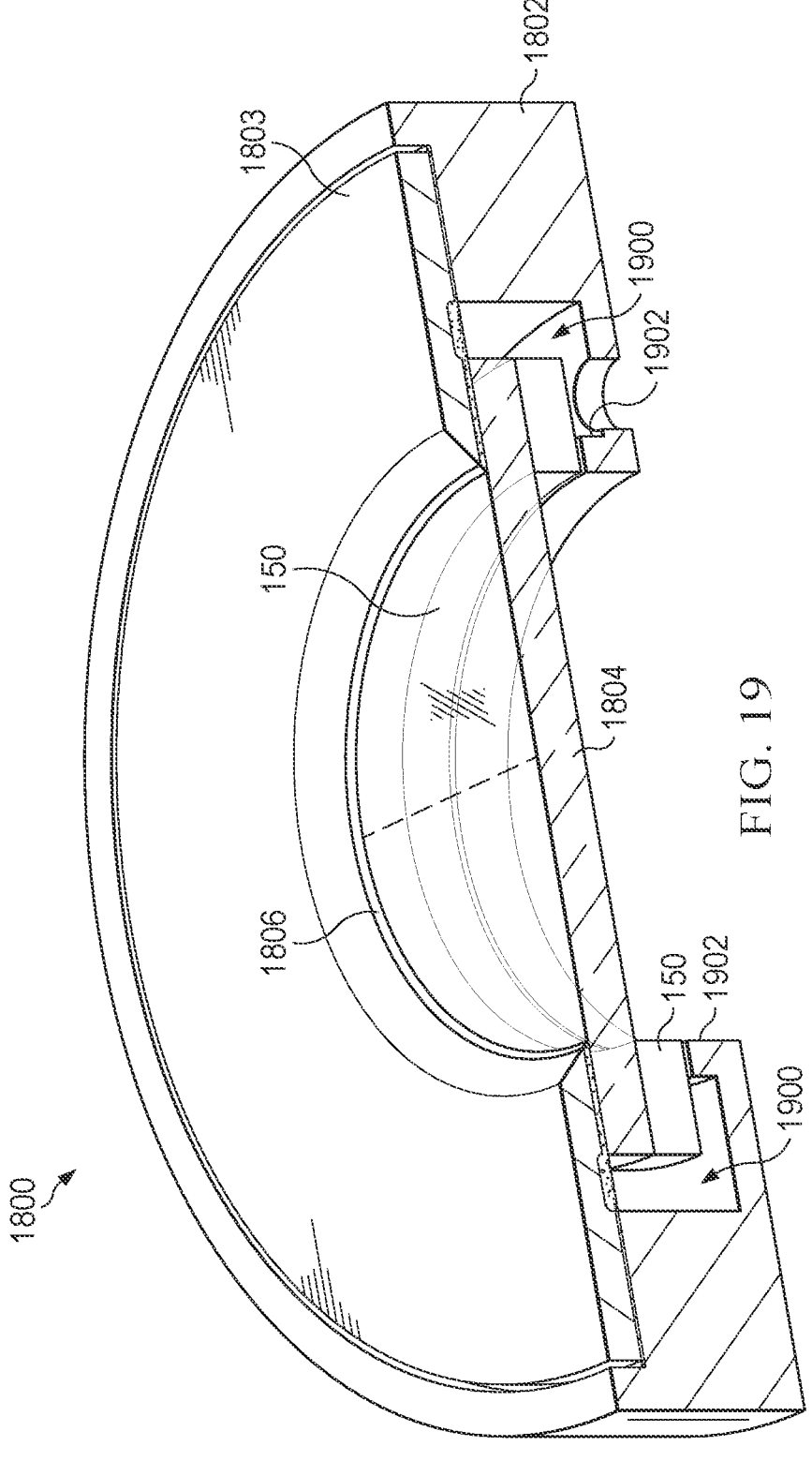
FIG. 19 is a cross sectional view of the example implementation of the lens cover system of FIG. 18.

FIG. 19 is a cross sectional view of the lens cover system 1800 of FIG. 18 for a flat lens. The example lens cover system 1800 of FIG. 19 includes the transducer 150 of FIG. 1. The lens cover system 1800 of FIG. 19 further includes the example housing 1802, which includes an example support ring 1902, the example lens 1804, and the membrane 1806 of FIG. 18. The example lens cover system 1800 of FIG. 19 further includes an example empty space or vacuum 1900 (e.g., also referred to as excess space). Although the example lens cover system 1800 of FIG. 19 is illustrated with particular shapes and dimensions, the shape or dimensions of one or more components of the lens cover system 1800 may be different. The lens covering system 1800 of FIG. 19 is structured to align the lens 1804, the opening of the housing 1802, the opening of the housing cap 1803 the opening of the membrane 1806, and the opening of the transducer 150 to provide a path from the lens 1804 to the photo diode 175 of FIG. 1.

The transducer 150 of FIG. 19 is a ring or cylindrical transducer that extends radially and includes an opening (e.g., a circular opening) through the center of the ring. The opening provides an optical path from the lens 1904 to the photo diode 175 of FIG. 1. The transducer 150 vibrates radially if activated by an excitation signal from the driver circuitry 105 of FIG. 1. As the transducer 150 vibrates radially, the transducer 150 pivots about its cross-sectional center, which causes the lens 1804 and the housing 1802 to vibrate up and down with respect to the orientation shown in FIG. 19. Also, as the transducer 150 vibrates, the diameter of the transducer 150 can change (e.g., the transducer 150 gets bigger or smaller). Thus, the housing 1802 includes, or houses, the empty space or vacuum 1900 to provide space for the transducer 150 to vibrate freely. In this manner, the transducer 150 will not contact the interior sides of the housing 1802 during vibration. A surface of the transducer 150 is connected to the bottom portion of the edge of the lens 1804 using an adhesive layer. In this manner, if the transducer 150 vibrates, the lens 1804 also vibrates as they are coupled to each other via the adhesive layer.

The top edge of the lens 1804 of FIG. 18 is coupled to the membrane 1806 using an adhesive layer. As described above in conjunction with FIG. 18, the membrane 1806 is structured to connect the lens 1804 to the housing cap 1803 using adhesive layers and reduce damping of the movement of the lens 1804 if the housing cap 1803 were directly connected to the lens 1804. In this manner, the transducer 150 can cause the lens 1804 to move with less power than in the lens covering systems 110, 200, 600, 1000, 1400 of FIGS. 1, 2, 3, 6, 7, 10, 11, 14, and 15. The adhesive layer connecting the lens 1804 to the membrane 1806 is applied throughout the connection between the lens 1804 and the membrane 1806 to provide 360-degree watertight seal between the membrane 1806 and the lens 1804. Also, the bottom of the membrane 1806 is connected to the housing 1802 using an adhesive layer that is applied throughout the connection between the housing 1802 and the membrane 1806 to provide a 360-degree watertight seal between the membrane 1806 and the housing 1802. Also, the top of the membrane 1806 is connected to the housing cap 1803 using an adhesive layer that is applied throughout the connection between the housing cap 1803 and the membrane 1806 to provide a 360-degree watertight seal between the membrane 1806 and the housing cap 1803.

In some examples, the side of the housing cap 1803 may be connected to the housing 1802 using an adhesive layer. In some examples, any combination of the housing cap 1803, the housing 1802, and the membrane 108 may be connected together using any one or more coupling techniques (e.g., adhesive, screw; bolt, solder, etc.). The adhesive layers of the lens covering system 1800 of FIG. 18 are or include an adhesive material, such as glue, epoxy, or any other adhesive material. The adhesive layers of the lens covering system 1800 of FIG. 18 are strong enough to withstand the sheer stress associated with the vibration.

The support ring 1902 of FIG. 19 is a portion of the housing 1802, which provides a backstop to block the transducer 150 from moving too far back toward the photo diode 175 of FIG. 1. For example, if an object (e.g., a rock, a stick, etc.) hits the lens 1804, the object can push the lens and the transducer 150 toward the photo diode 175 of FIG. 1. Without the support ring 1902 and with enough force, the lens 1804 can become detached from the membrane 1806. Accordingly, the support ring 1902 is structured as a backstop to prevent the lens 1804 from moving more than a threshold distance from the membrane 1806 to prevent detachment.

Figure 20:
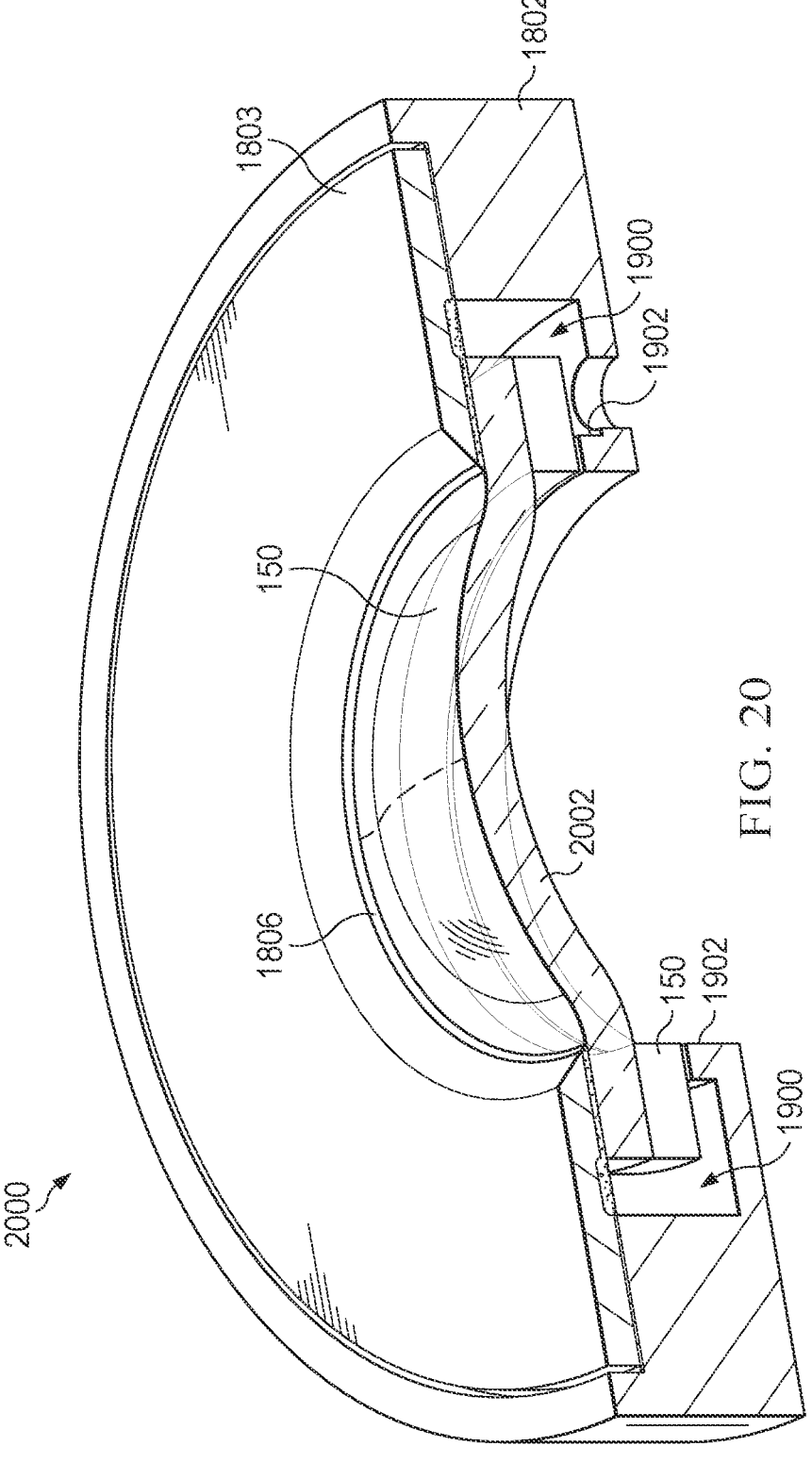
FIG. 20 is a cross sectional view of an example implementation of a lens cover system with a curved lens.

FIG. 20 is a cross sectional view of the lens cover system 200 for a curved lens. The lens cover system 2000 includes all of the same components as the lens covering system 1800 of FIG. 19, except the flat lens 1804 is replaced with an example covered lens 2002. However, the connections via the adhesive layers and the other components are the same as in FIG. 19. Although the example lens cover system 20000 of FIG. 20 is illustrated with particular shapes and dimensions, the shape or dimensions of one or more components of the lens cover system 2000 may be different. The lens covering system 2000 of FIG. 20 is structured to align the lens 2002, the opening of the housing 1802, the opening of the housing cap 1803 the opening of the membrane 1806, and the opening of the transducer 150 to provide a path from the lens 2002 to the photo diode 175 of FIG. 1.

In some examples, portions of the example implementation of the lens cover system 110, 200, 600, 1000, 1400, 1800, 200 of FIGS. 1, 2, 3, 6, 7, 10, 11, 14, 15, and 18-20 may be exchanged, combined, or removed to generate alternative implementations with the same functionality.

An example manner of implementing the lens cover system 110 of FIG. 1 is illustrated in FIGS. 1, 2, 3, 6, 7, 10, 11, 14, 15, and 18-20. However, one or more of the elements, processes or devices illustrated in FIGS. 1-3 and 4-5 may be combined, divided, re-arranged, omitted, eliminated or implemented in any other way.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

Descriptors "first," "second," "third," etc. are used herein to identify multiple elements or components which may be referred to separately. Unless otherwise specified or known based on their context of use, such descriptors do not impute any meaning of priority, physical order, or arrangement in a list, or ordering in time but are merely used as labels for referring to multiple elements or components separately for ease of understanding the described examples. In some examples, the descriptor "first" may be used to refer to an element in the detailed description, and the same element may be referred to in a claim with a different descriptor such as "second" or "third." In such instances, such descriptors are used merely for ease of referencing multiple elements or components.

In the description and in the claims, the terms "including" and "having." and variants thereof are to be inclusive in a manner similar to the term "comprising" unless otherwise noted. Unless otherwise stated, "about." "approximately." or "substantially" preceding a value means +/−10 percent of the stated value. In another example, "about." "approximately." or "substantially" preceding a value means +/−5 percent of the stated value. IN another example, "about," "approximately." or "substantially" preceding a value means +/−1 percent of the stated value.

The terms "couple." "coupled." "couples." and variants thereof, as used herein, may cover connections, communications, or signal paths that enable a functional relationship consistent with this description. For example, if device A generates a signal to control device B to perform an action, if a first example device A is coupled to device B, or if a second example device A is coupled to device B through intervening component C if intervening component C does not substantially alter the functional relationship between device A and device B, such that device B is controlled by device A via the control signal generated by device A. Moreover, the terms "couple," "coupled", "couples", or variants thereof, includes an indirect or direct electrical or mechanical connection.

A device that is "configured to" perform a task or function may be configured (e.g., at least one of programmed or hardwired) at a time of manufacturing by a manufacturer to perform the function or may be configurable (or re-configurable) by a user after manufacturing to perform the function or other additional or alternative functions. The configuring may be through at least one of firmware or software programming of the device, through a construction or layout of hardware components and interconnections of the device, or a combination thereof.

Although not all separately labeled in FIG. 1 components or elements of systems and circuits illustrated therein have one or more conductors or terminus that allow signals into or out of the components or elements. The conductors or terminus (or parts thereof) may be referred to herein as pins, pads, terminals (including input terminals, output terminals, reference terminals, and ground terminals, for instance), inputs, outputs, nodes, and interconnects.

As used herein, a "terminal" of a component, device, system, circuit, integrated circuit, or other electronic or semiconductor component, generally refers to a conductor such as a wire, trace, pin, pad, or other connector or interconnect that enables the component, device, system, etc., to electrically or mechanically connect to another component, device, system, etc. A terminal may be used, for instance, to receive or provide analog or digital electrical signals (or simply signals) or to electrically connect to a common or ground reference. Accordingly, an input terminal or input is used to receive a signal from another component, device, system, etc. An output terminal or output is used to provide a signal to another component, device, system, etc. Other terminals may be used to connect to a common, ground, or voltage reference, e.g., a reference terminal or ground terminal. A terminal of an IC or a PCB may also be referred to as a pin (a longitudinal conductor) or a pad (a planar conductor). A node refers to a point of connection or interconnection of two or more terminals. An example number of terminals and nodes may be shown. However, depending on a particular circuit or system topology, there may be more or fewer terminals and nodes. However, in some instances, "terminal." "node," "interconnect," "pad," and "pin" may be used interchangeably.

The term "or" if used, for example, in a form such as A, B, or C refers to any combination or subset of A, B, C such as (1) A alone, (2) B alone, (3) C alone, (4) A with B, (5) A with C, (6) B with C, or (7) A with B and with C.

Notwithstanding the foregoing, in the case of referencing components, "above," "below," "top," "bottom," and "side," is not with reference to Earth, but instead is with reference to an underlying component on which relevant components are fabricated, assembled, mounted, supported, or otherwise provided. Thus, as used herein and unless otherwise stated or implied from the context, a first component is "above" or "on top" a second component if the first component is farther away from a substrate (e.g., a semiconductor wafer) or other reference component during fabrication/manufacturing than the second component on which the two components are fabricated or otherwise provided. Likewise, in the above example, the second component is "below" or "on bottom" the first component. However, described components are often used in orientation different than their orientation during fabrication. Thus, devices that are manufactured with a first component above a second component. However, if the device is implemented at a different orientation (e.g., rotated 90 degrees, turned upside down, etc.) the first component may be below or next to the second component with respect to Earth.

Example methods, apparatus, and systems in conjunction with a watertight housing designed for ultrasonic lens cleaning are described herein. Further examples and combinations thereof include the following: Example 1 includes an apparatus comprising a transducer having a surface and an opening, a bracket having a first surface, a second surface, a third surface, and an opening, the first surface of the bracket coupled to the surface of the transducer, the opening of the bracket aligned with the opening of the transducer, and a lens having a first surface and a second surface, the first surface of the lens is coupled to the second surface of the bracket, the second surface of the lens coupled to the third surface of the bracket, the lens covering the opening of the transducer and the opening of the bracket.

Example 2 includes the apparatus of example 1, wherein the transducer is a cylindrical transducer, the opening of the transducer and the opening of the bracket is a circular opening that allows the lens to provide a field of view through both the transducer and the bracket.

Example 3 includes the apparatus of example 1, wherein the bracket further has a fourth surface, fifth surface, and a sixth surface, the first surface and the fourth surface of the bracket to house the transducer, the second surface and the third surface of the bracket to house the lens, the fifth and sixth surface of the bracket to house empty space opposite of the lens.

Example 4 includes the apparatus of example 1, further comprising a first adhesive layer coupled between the surface of the transducer and the first surface of the bracket, a second adhesive layer coupled between the second surface of the bracket and the first surface of the lens, and a third adhesive layer coupled between the third surface of the bracket and the second surface of the lens.

Example 5 includes the apparatus of example 1, wherein the lens further has a third surface, the lens is a curved lens, the bracket is a first bracket, and the apparatus further comprising a second bracket having a first surface and a second surface, the first surface of the second bracket coupled to the third surface of the curved lens, the second surface of the second bracket coupled to the third surface of the first bracket.

Example 6 includes the apparatus of example 5, further comprising a first adhesive layer coupled between the surface of the transducer and the first surface of the first bracket, and a second adhesive layer coupled between the second surface of the first bracket and the first surface of the curved lens, a third adhesive layer coupled between the second surface of the first bracket and the second surface of the curved lens, a fourth adhesive layer coupled between the third surface of the curved lens and the first surface of the second bracket, and a fifth adhesive layer coupled between the third surface of the first bracket and the second surface of the second bracket.

Example 7 includes the apparatus of example 1, wherein the bracket further has a fourth surface, the apparatus further comprising a housing having a surface and an opening, the surface of the housing coupled to the fourth surface of the bracket, the opening of the housing aligned with the opening of the transducer and the opening of the bracket.

Example 8 includes the apparatus of example 1, further comprising photo diode circuitry having an optical input, the optical input coupled to the lens by the opening of the transducer and the opening of the bracket, and driver circuitry coupled to the transducer.

Example 9) includes an apparatus comprising a transducer having a surface and an opening, a bracket having a first surface, a second surface, a third surface, and an opening, the first surface of the bracket coupled to the surface of the transducer, the first surface and the second surface of the bracket enclose the transducer, and a housing having a surface and an opening, the surface of the housing coupled to the third surface of the bracket, the opening of the housing aligned with the opening of the transducer and the opening of the bracket.

Example 10 includes the apparatus of example 9, wherein the transducer is a cylindrical transducer, the opening of the transducer, the opening of the bracket, and the opening of the housing are circular openings that provide an optical path through the apparatus.

Example 11 includes the apparatus of example 9, wherein the bracket further has a fourth surface and a fifth surface, the apparatus further comprising a lens having a first surface and a second surface, the first surface of the lens coupled to the fourth surface of the bracket, the second surface of the lens coupled to the fifth surface of the bracket, the lens to cover the opening of the transducer, the opening of the bracket, and the opening of the housing.

Example 12 includes the apparatus of example 9, wherein the bracket further has a fourth surface and a fifth surface, the fourth surface and the fifth surface of the bracket to enclose an empty space, the fourth surface and the fifth surface of the bracket separate from the second surface of the bracket and the third surface of the bracket, the empty space created between the transducer and the housing.

Example 13 includes the apparatus of example 9, further comprising a camera having a field of view; the housing to position the bracket and the transducer in relation to the camera. the field of view of the camera aligned with the opening of the transducer, the opening of the bracket, and the opening of the housing.

Example 14 includes the apparatus of example 9, further comprising driver circuitry coupled to the transducer, the transducer to convert electrical energy from the driver circuitry to mechanical energy.

Example 15 includes a system comprising a transducer having a surface, a bracket having a first surface and a second surface, the first surface of the bracket is coupled to the surface of the transducer, the bracket to enclose the transducer, a lens having a surface coupled to the second surface of the bracket, the bracket separates the transducer and the lens, driver circuitry coupled to the transducer, the driver circuitry configured to supply electrical energy to the transducer, and the transducer is configured to vibrate the lens responsive to receiving electrical energy from the driver circuitry.

Example 16 includes the system of example 15, wherein the transducer is configured to remove contaminants from the lens by vibrating at a first frequency and a second frequency.

Example 17 includes the system of example 15, further comprising a first adhesive layer coupled between the surface of the transducer and the first surface of the bracket, and a second adhesive layer coupled between the second surface of the bracket and the surface of the lens.

Example 18 includes the system of example 17, wherein the first adhesive layer and the second adhesive layer are created by an adhesive material corresponding to a threshold shear stress, the driver circuitry is configured to supply a magnitude of electrical energy that prevents the vibrations of the transducer from exceeding the threshold shear stress of the adhesive material.

Example 19 includes an apparatus comprising a cap having a first surface and an opening, a membrane having a first surface, a second surface, and an opening, the first surface of the membrane coupled to the first surface of the cap, the opening of the membrane aligned with the opening of the cap, a transducer having a surface and an opening, and a lens having a first surface and a second surface, the first surface of the lens is coupled to the second surface of the membrane, the second surface of the lens coupled to the surface of the transducer, the lens covering the opening of the transducer, the opening of the membrane, and the opening of the cap.

Example 20 includes the apparatus of example 19, further including a housing including a first surface, the first surface of the housing coupled to the second surface of the membrane.

Example 21 includes the apparatus of example 20, wherein the housing has a support ring, the support ring aligned with the transducer.

Example 22 includes the apparatus of example 19, wherein the first surface of the membrane is coupled to the first surface of the cap using a first adhesive layer, the first surface of the lens is coupled to the second surface of the membrane using a second adhesive layer, and the second surface of the lens is coupled to the surface of the transducer using a third adhesive layer.

Modifications are possible in the described examples, and other examples are possible, within the scope of the claims.

What is claimed is:

1. An apparatus comprising:
a transducer having a surface and an opening;
a first bracket having a first surface, a second surface, a third surface, and an opening, the first surface of the first bracket coupled to the surface of the transducer, the opening of the first bracket aligned with the opening of the transducer;
a second bracket having a first surface and a second surface, the second surface of the second bracket coupled to the third surface of the first bracket; and
a curved lens having a first surface, a second surface, and a third surface, the first surface of the curved lens is coupled to the second surface of the first bracket, the second surface of the curved lens coupled to the third surface of the first bracket, the third surface of the curved lens coupled to the first surface of the second bracket, the curved lens covering the opening of the transducer and the opening of the first bracket.

2. The apparatus of claim 1, wherein the transducer is a cylindrical transducer or a ring transducer, the opening of the transducer and the opening of the first bracket is a circular opening that allows the curved lens to provide a field of view through both the transducer and the first bracket.

3. The apparatus of claim 1, wherein the first bracket further has a fourth surface, a fifth surface, and a sixth surface, the first surface and the fourth surface of the first bracket to house the transducer, the second surface and the third surface of the first bracket and the first surface of the second bracket to house the curved lens, the fifth and sixth surface of the first bracket to house empty space opposite of the curved lens.

4. The apparatus of claim 1, further comprising:
a first adhesive layer coupled between the surface of the transducer and the first surface of the first bracket;

a second adhesive layer coupled between the second surface of the first bracket and the first surface of the curved lens; and
a third adhesive layer coupled between the third surface of the first bracket and the second surface of the curved lens.

5. The apparatus of claim 1, further comprising:
a first adhesive layer coupled between the surface of the transducer and the first surface of the first bracket; and
a second adhesive layer coupled between the second surface of the first bracket and the first surface of the curved lens;
a third adhesive layer coupled between the third second surface of the first bracket and the second surface of the curved lens;
a fourth adhesive layer coupled between the third surface of the curved lens and the first surface of the second bracket; and
a fifth adhesive layer coupled between the third surface of the first bracket and the second surface of the second bracket.

6. The apparatus of claim 1, wherein the first bracket further has a fourth surface, the apparatus further comprising a housing having a surface and an opening, the surface of the housing coupled to the fourth surface of the first bracket, opening of the housing aligned with the opening of the transducer and the opening of the first bracket.

7. The apparatus of claim 1, further comprising:
photo diode circuitry having an optical input, the optical input coupled to the curved lens by the opening of the transducer and the opening of the first bracket; and
driver circuitry coupled to the transducer.

8. The apparatus of claim 1, further including a housing having a surface and an opening, the first bracket including:
a fourth surface perpendicular to and intersecting the first surface;
a fifth surface parallel to the first surface, the fourth surface traversing between the first surface and the fifth surface;
a sixth surface perpendicular to and intersecting the fifth surface; and
a seventh surface parallel to the fifth surface, the sixth surface traversing between the fifth surface and the seventh surface, the surface of the housing coupled to the seventh surface of the first bracket.

9. An apparatus comprising:
a transducer having a surface and an opening;
a first bracket having a first surface, a second surface, a third surface, a fourth surface, a fifth surface, and an opening, the first surface of the first bracket coupled to the surface of the transducer, the first surface and the fourth surface of the first bracket enclose the transducer;
a second bracket having a first surface and a second surface, the second surface of the second bracket coupled to the third surface of the first bracket;
a curved lens having a first surface, a second surface, and a third surface, the first surface of the curved lens is coupled to the second surface of the first bracket, the second surface of the curved lens coupled to the third surface of the first bracket, the third surface of the curved lens coupled to the first surface of the second bracket; and
a housing having a surface and an opening, the surface of the housing coupled to the fifth third surface of the first bracket, the opening of the housing aligned with the opening of the transducer and the opening of the first bracket, the curved lens covering the opening of the transducer, the opening of the first bracket, and the opening of the housing.

10. The apparatus of claim 9, wherein the transducer is a cylindrical transducer or a ring transducer, the opening of the transducer, the opening of the first bracket, and the opening of the housing are circular openings that provide an optical path through the apparatus.

11. The apparatus of claim 9, wherein the first bracket further has a sixth surface and a seventh surface, the sixth surface and the seventh surface of the first bracket to enclose an empty space, the sixth surface and the seventh surface of the first bracket separate from the fourth surface of the first bracket and the fifth surface of the first bracket, the empty space created between the transducer and the housing.

12. The apparatus of claim 9, further comprising a camera having a field of view, the housing to position the first bracket and the transducer in relation to the camera, the field of view of the camera aligned with the opening of the transducer, the opening of the first bracket, and the opening of the housing.

13. The apparatus of claim 9, further comprising driver circuitry coupled to the transducer, the transducer to convert electrical energy from the driver circuitry to mechanical energy.

14. The apparatus of claim 9, wherein the first bracket includes:

a sixth surface perpendicular to and intersecting the first surface;

a seventh surface parallel to the first surface, the sixth surface traversing between the first surface and the seventh surface; and an eighth surface perpendicular to and intersecting the seventh surface, the eighth surface traversing between the seventh surface and the fifth surface, the fifth surface parallel to the seventh surface.

15. A system comprising:

a transducer having a surface;

a bracket having a first surface and a second surface, the first surface of the bracket is coupled to the surface of the transducer, the bracket to enclose the transducer;

a first adhesive layer coupled between the surface of the transducer and the first surface of the bracket;

a lens having a surface coupled to the second surface of the bracket, the bracket separates the transducer and the lens;

a second adhesive layer coupled between the second surface of the bracket and the surface of the lens, the first adhesive layer and the second adhesive layer are created by an adhesive material corresponding to a threshold shear stress;

driver circuitry coupled to the transducer, the driver circuitry configured to supply electrical energy to the transducer; and the transducer is configured to vibrate the lens responsive to receiving electrical energy from the driver circuitry, the driver circuitry is configured to supply the electrical energy at a magnitude that prevents vibrations of the transducer from exceeding the threshold shear stress of the adhesive material.

16. The system of claim 15, wherein the transducer is configured to remove contaminants from the lens by vibrating at a first frequency and a second frequency.

17. The system of claim 15, wherein the surface of the lens is a first surface, the lens has a second surface, and the bracket has a third surface coupled to the second surface of the lens, the second surface and the third surface of the bracket housing the lens.

18. The system of claim 17, further including a third adhesive layer coupled between the second surface of the lens and the third surface of the bracket, the third adhesive layer created by the adhesive material corresponding to the threshold shear stress.

19. An apparatus comprising:

a cap having a first surface and an opening;

a membrane having a first surface, a second surface, and an opening, the first surface of the membrane coupled to the first surface of the cap, the opening of the membrane aligned with the opening of the cap;

a transducer having a surface and an opening; and a lens having a first surface and a second surface, the first surface of the lens is coupled to the second surface of the membrane, the second surface of the lens coupled to the surface of the transducer, the lens covering the opening of the transducer, the opening of the membrane, and the opening of the cap.

20. The apparatus of claim 19, wherein the transducer is a cylindrical transducer or a ring transducer, the opening of the transducer and the opening of the membrane is a circular opening that allows the lens to provide a field of view through the transducer and the membrane.

21. The apparatus of claim 19, further including a housing including a first surface, the first surface of the housing coupled to the second surface of the membrane.

22. The apparatus of claim 21, wherein the housing has a support ring, the support ring aligned with the transducer.

23. The apparatus of claim 19, wherein the first surface of the membrane is coupled to the first surface of the cap using a first adhesive layer, the first surface of the lens is coupled to the second surface of the membrane using a second adhesive layer, and the second surface of the lens is coupled to the surface of the transducer using a third adhesive layer.

* * * * *